US012577828B2

(12) United States Patent
Johnson et al.

(10) Patent No.: US 12,577,828 B2
(45) Date of Patent: Mar. 17, 2026

(54) COASTAL IMPACT RESISTANT FENESTRATIONS INCLUDING CORNER KEY WITH OVERLAP GEOMETRY

(71) Applicant: Andersen Corporation, Bayport, MN (US)

(72) Inventors: Craig Michael Johnson, North Oaks, MN (US); Christopher Michael Hanson, Fridley, MN (US)

(73) Assignee: Andersen Corporation, Bayport, MN (US)

( * ) Notice: Subject to any disclaimer, the term of this patent is extended or adjusted under 35 U.S.C. 154(b) by 651 days.

(21) Appl. No.: 17/941,692

(22) Filed: Sep. 9, 2022

(65) Prior Publication Data

US 2023/0151676 A1 May 18, 2023

Related U.S. Application Data

(60) Provisional application No. 63/242,874, filed on Sep. 10, 2021.

(51) Int. Cl.

*E06B 3/22* (2006.01)
*E06B 3/964* (2006.01)
*E06B 5/10* (2006.01)

(52) U.S. Cl.

CPC .............. *E06B 3/9644* (2013.01); *E06B 3/22* (2013.01); *E06B 5/10* (2013.01)

(58) Field of Classification Search

CPC . E06B 3/22; E06B 3/221; E06B 3/222; E06B 3/223; E06B 3/4415; E06B 3/964;

(Continued)

(56) References Cited

U.S. PATENT DOCUMENTS 1,295,728 A * 2/1919 Goddard .................. B60P 3/36 52/656.3
2,573,223 A 10/1951 Jordan et al.

(Continued)

FOREIGN PATENT DOCUMENTS

CH 397210 A * 8/1965 ........... E06B 3/9682
DE 10033389 A1 * 1/2002 ............ E06B 3/222

(Continued)

OTHER PUBLICATIONS

"Non-Final Office Action," for U.S. Appl. No. 17/941,698 mailed Aug. 3, 2023 (14 pages).

(Continued)

*Primary Examiner* — Ryan D Kwiecinski
(74) *Attorney, Agent, or Firm* — Pauly, DeVries Smith & Deffner LLC

(57) ABSTRACT

Embodiments herein relate to fenestrations, such as windows and doors, exhibiting coastal impact performance. In a first aspect, an impact-resistant fenestration unit can be included having a frame assembly including a sill, a head jamb, and two opposed side jambs. A bottom sash can be included having a bottom rail, a check rail, and two opposed stiles. A first corner key can be configured to engage the bottom sash at a first lower corner. The first corner key can include a support arm extending in a first direction onto or into a first stile of the two opposed stiles. A first reinforcement member disposed on or within the first stile. The first reinforcement member can include a first end and a second end. The first end can overlap a portion of the support arm of the first corner key. Other embodiments are also included herein.

19 Claims, 11 Drawing Sheets

(58) Field of Classification Search
CPC .... E06B 3/9644; E06B 3/9645; E06B 3/9681; E06B 3/9682; E06B 2003/224; E06B 2003/227; E06B 5/10; E06B 5/12
See application file for complete search history.

(56) References Cited

U.S. PATENT DOCUMENTS 2,791,456 A 5/1957 Roehl et al.
3,712,482 A 1/1973 Bondowski
3,949,526 A * 4/1976 Sherlock ................ E06B 3/221 52/786.13
3,956,855 A * 5/1976 Walker .................... E06B 3/964 403/231
4,136,470 A * 1/1979 Barz ........................ A47G 1/10 40/782
4,513,554 A * 4/1985 Johnson ................ E06B 3/4636 49/404
4,956,940 A 9/1990 Touton
4,995,213 A * 2/1991 Bezubic .................. E06B 3/223 403/402
5,144,780 A * 9/1992 Gieling ..................... F16B 7/04 52/298
5,301,467 A 4/1994 Schmidt et al.
5,491,940 A 2/1996 Bruchu
5,622,017 A * 4/1997 Lynn ................. B29C 66/72523 52/204.5
5,787,657 A * 8/1998 Librande ........... B29C 66/81431 160/369
6,073,412 A 6/2000 Verch
6,565,133 B1 5/2003 Timothy
6,802,156 B2 10/2004 Sherrett et al.
7,258,757 B2 * 8/2007 Huang .............. B32B 17/10055 156/107
7,607,262 B2 10/2009 Pettit et al.
7,614,188 B2 11/2009 Hetherington et al.
7,827,734 B2 11/2010 Cox et al.
7,950,192 B2 * 5/2011 Glover .............. B29C 66/72523 52/204.593
8,596,017 B2 12/2013 Emanuel
8,652,382 B2 * 2/2014 Eggert .............. B29C 45/14467 264/261
8,857,129 B2 10/2014 Beranek
8,955,255 B2 2/2015 Deboer et al.
9,167,939 B2 * 10/2015 Wei .......................... A47K 3/30
9,611,688 B1 4/2017 Vanderbent et al.
9,631,415 B2 4/2017 Eisenbarth et al.
9,657,503 B2 * 5/2017 Hollermann ............ E05D 15/22
9,718,253 B2 8/2017 Farmer et al.
10,093,051 B2 * 10/2018 Eggert .................... B29C 45/14
10,094,164 B2 * 10/2018 Massey ................. E06B 3/9642
10,119,325 B2 * 11/2018 Barton .................. E05D 15/582
10,174,544 B2 * 1/2019 Kellum ................. E06B 3/9646
10,180,015 B1 1/2019 Grainger et al.
D856,781 S * 8/2019 Hendry .......................... D8/354
10,538,948 B1 1/2020 Johnson et al.
10,550,257 B2 2/2020 Peterson et al.
10,731,400 B2 * 8/2020 Bolduc ..................... E06B 1/62
10,927,578 B2 * 2/2021 Vander, Jr. ............ E06B 3/9647
10,968,674 B1 4/2021 Johnson et al.
11,118,376 B1 9/2021 Liang et al.
11,326,391 B2 * 5/2022 Luvison ................ E06B 3/5821
11,499,362 B2 * 11/2022 Hay, III ................ E06B 3/4415
11,519,218 B2 * 12/2022 Luvison ................ E06B 3/9647
11,939,811 B2 * 3/2024 Johnson ................ E06B 3/9687
2002/0000724 A1 1/2002 Kalargeros et al.
2002/0044823 A1 * 4/2002 Sosa ......................... F16B 7/18 403/382
2005/0016067 A1 1/2005 Pettit et al.
2006/0010792 A1 1/2006 Biggers
2006/0192391 A1 8/2006 Pettit et al.
2006/0233600 A1 * 10/2006 Egli ...................... E06B 3/9646 403/294
2007/0297854 A1 * 12/2007 Ohrstrom .............. E06B 3/9647 403/401
2009/0311449 A1 12/2009 Fehlmann et al.
2010/0192508 A1 * 8/2010 Subra .................... E06B 3/9616 52/656.9
2010/0313478 A1 * 12/2010 Montz .................. E06B 3/4415 49/70
2012/0279166 A1 * 11/2012 Valler ....................... E06B 3/22 52/656.2
2013/0127182 A1 5/2013 Bendel et al.
2014/0326126 A1 11/2014 Hay et al.
2014/0373464 A1 12/2014 Benevenga et al.
2015/0121788 A1 * 5/2015 Kim .................... E06B 3/26341 52/656.5
2017/0240738 A1 8/2017 Ehrlichmann et al.
2020/0263489 A1 * 8/2020 Feil ......................... E06B 3/968
2020/0332593 A1 10/2020 Ribberink
2021/0246716 A1 * 8/2021 Luvison ................ E06B 3/9647
2022/0010611 A1 1/2022 Rietz et al.
2022/0090435 A1 * 3/2022 Hamilton ................ E05D 15/22
2023/0151654 A1 5/2023 Johnson et al.
2023/0151676 A1 * 5/2023 Johnson ................ E06B 3/4415 52/204.5
2023/0151677 A1 * 5/2023 Johnson ................ E06B 3/9647 52/204.5
2023/0175310 A1 * 6/2023 Kalverkamp ......... E06B 3/9608 52/204.5
2023/0295980 A1 * 9/2023 Steademan ............ E06B 3/962 52/656.9

FOREIGN PATENT DOCUMENTS

DE 202005021045 2/2007
DE 202012104587 12/2012
DE 102011055037 5/2013
DE 102020126640 4/2022
EP 1270864 1/2003
EP 1550786 7/2005
EP 1726764 A2 * 11/2006 ............ E06B 3/221
EP 2202378 6/2010
EP 2469003 6/2012
EP 2589739 5/2013
EP 2735687 A1 * 5/2014 ........... E06B 3/5814
EP 3511509 A1 * 7/2019 ............. E06B 3/222
EP 3034768 B1 * 5/2020 ............. E06B 3/222
EP 3712368 A1 * 9/2020 ........... E06B 3/9608
FR 2960900 12/2011
FR 3055650 3/2018
GB 2086458 5/1982
GB 2290573 A * 1/1996 ............... E06B 1/02
GB 2416561 A * 2/2006 ........... E06B 3/9687
GB 2442733 A * 4/2008 ............. E06B 5/164
GB 2494641 A * 3/2013 ............. E06B 3/222
GB 2536661 A * 9/2016 ........... E06B 3/9604
KR 20090005423 U * 6/2009 ........... E06B 3/9608
KR 20240002537 A * 1/2024 ............. E06B 3/222
KR 20250039959 A * 3/2025 ........... E06B 3/9608
WO WO-9821435 A1 * 5/1998 ............. E06B 3/222
WO 0058589 10/2000
WO WO-2012019748 A1 * 2/2012 ............... E06B 3/22
WO WO-2012105915 A1 * 8/2012 ............. E06B 3/205
WO WO-2014026756 A1 * 2/2014 ............. E06B 3/306
WO WO-2014102558 A1 * 7/2014 .............. F16B 12/50
WO WO-2015144795 A1 * 10/2015 ............. E06B 3/222
WO 2017221222 12/2017
WO 2018053510 3/2018

OTHER PUBLICATIONS

"Notice of Allowance," for U.S. Appl. No. 17/941,698 mailed Nov. 22, 2023 (10 pages).
"Response to Non-Final Office Action," for U.S. Appl. No. 17/941,698 mailed Nov. 2, 2023 (10 pages).
"Non-Final Office Action," for U.S. Appl. No. 17/941,696 mailed Mar. 13, 2025 (25 pages).
"Notice of Allowance," for U.S. Appl. No. 17/941,696 mailed Jul. 11, 2025 (10 pages).

(56) References Cited

OTHER PUBLICATIONS

"Response to Non-Final Office Action,," for U.S. Appl. No. 17/941,696, filed Jun. 11, 2025 (14 pages).

* cited by examiner

COASTAL IMPACT RESISTANT FENESTRATIONS INCLUDING CORNER KEY WITH OVERLAP GEOMETRY

This application claims the benefit of U.S. Provisional Application No. 63/242,874 filed Sep. 10, 2021, the content of which is herein incorporated by reference in its entirety.

FIELD

Embodiments herein relate to fenestrations, such as windows and doors, exhibiting coastal impact performance.

BACKGROUND

Tropical storms and hurricanes can include very high wind speeds that can result in substantial amounts of objects being picked up by the wind and becoming dangerous wind driven projectiles. Such projectiles can cause glass breakage and other damage to buildings and components thereof such as windows and doors. To prevent such damage and the potential for injuries associated with the same, building codes and standards for certain coastal areas have been established to require that fenestrations meet certain requirements for high wind loads and impact resistance.

Modern fenestrations including windows and doors are recognized by architects and discerning homeowners as a positive source of aesthetics and style for the modern home while also providing remarkable energy efficiency. However, the engineering requirements associated with achieving new coastal building code requirements function as a design constraint often resulting in fenestrations without positive aesthetics and without high levels of other types of fenestration performance such as insulation and energy efficiency.

SUMMARY

Embodiments herein relate to fenestrations, such as windows and doors, exhibiting coastal impact performance. In a first aspect, an impact-resistant fenestration unit can be included having a frame assembly including a sill, a head jamb, and two opposed side jambs. A bottom sash can be included having a bottom rail, a check rail, and two opposed stiles, the bottom sash configured to move within the frame between a closed position where a bottom portion of the bottom sash engages a top of the sill and an open position where the bottom portion of the bottom sash can be separated from the top of the sill. The bottom sash can form a first lower corner, a second lower corner, a first upper corner, and a second upper corner. A first corner key can be configured to engage the bottom sash at the first lower corner. The first corner key can include a support arm extending in a first direction onto or into a first stile of the two opposed stiles. A first reinforcement member disposed on or within the first stile. The first reinforcement member can include a first end and a second end, wherein the first end overlaps a portion of the support arm of the first corner key.

In a second aspect, in addition to one or more of the preceding or following aspects, or in the alternative to some aspects, the first end of the first reinforcement member overlaps a portion of the support arm of the first corner key on a side of the first corner key facing an exterior side of the impact-resistant fenestration unit.

In a third aspect, in addition to one or more of the preceding or following aspects, or in the alternative to some aspects, the impact-resistant fenestration unit can further include a second corner key configured to engage the bottom sash at the second lower corner. The second corner key can include a support arm extending in the first direction onto or into a second stile of the two opposed stiles. A second reinforcement member can be disposed on or within the second stile. The second reinforcement member can include a first end and a second end, wherein the first end overlaps a portion of the support arm of the second corner key.

In a fourth aspect, in addition to one or more of the preceding or following aspects, or in the alternative to some aspects, the first end of the second reinforcement member overlaps a portion of the support arm of the second corner key on a side of the second corner key facing an exterior side of the impact-resistant fenestration unit.

In a fifth aspect, in addition to one or more of the preceding or following aspects, or in the alternative to some aspects, the impact-resistant fenestration unit can further include a third corner key configured to engage the bottom sash at the first upper corner, the third corner key can include a support arm extending in a second direction that can be opposite the first direction onto or into the first stile of the two opposed stiles. The impact-resistant fenestration unit can further include a fourth corner key configured to engage the bottom sash at the second upper corner, the fourth corner key can include a support arm extending in the second direction onto or into the second stile of the two opposed stiles. The second end of the first reinforcement member can overlap a portion of the support arm of the third corner key and the second end of the second reinforcement member can overlap a portion of the support arm of the fourth corner key.

In a sixth aspect, in addition to one or more of the preceding or following aspects, or in the alternative to some aspects, the impact-resistant fenestration unit can further include a third reinforcement member and a fourth reinforcement member, wherein the third reinforcement member can be disposed on or within the bottom rail, and wherein the fourth reinforcement member can be disposed on or within the check rail.

In a seventh aspect, in addition to one or more of the preceding or following aspects, or in the alternative to some aspects, the first end of the first reinforcement member overlaps a portion of the support arm of the first corner key by a distance of at least 0.1 inches.

In an eighth aspect, in addition to one or more of the preceding or following aspects, or in the alternative to some aspects, the first reinforcement member further can include an overlap tab projecting from the first end of the first reinforcement member.

In a ninth aspect, in addition to one or more of the preceding or following aspects, or in the alternative to some aspects, the overlap tab can be uniplanar.

In a tenth aspect, in addition to one or more of the preceding or following aspects, or in the alternative to some aspects, the overlap tab having a thickness less than an adjacent portion of the first reinforcement member.

In an eleventh aspect, in addition to one or more of the preceding or following aspects, or in the alternative to some aspects, the overlap tab can be physically unattached to the support arm of the first corner key.

In a twelfth aspect, in addition to one or more of the preceding or following aspects, or in the alternative to some aspects, the first end of the first reinforcement member can be attached to the support arm of the first corner key.

In a thirteenth aspect, in addition to one or more of the preceding or following aspects, or in the alternative to some aspects, the first end of the first reinforcement member can be adhesively bonded to the support arm of the first corner key.

In a fourteenth aspect, in addition to one or more of the preceding or following aspects, or in the alternative to some aspects, the first end of the first reinforcement member can be mechanically fastened to the support arm of the first corner key.

In a fifteenth aspect, in addition to one or more of the preceding or following aspects, or in the alternative to some aspects, the first reinforcement member can include a metal bar.

In a sixteenth aspect, in addition to one or more of the preceding or following aspects, or in the alternative to some aspects, the first reinforcement member can include an aluminum bar.

In a seventeenth aspect, in addition to one or more of the preceding or following aspects, or in the alternative to some aspects, the first reinforcement member can include an angled metal bar.

In an eighteenth aspect, in addition to one or more of the preceding or following aspects, or in the alternative to some aspects, the bottom rail, check rail, and two opposed stiles formed from a lineal extrusion can include a thermoplastic resin.

In a nineteenth aspect, in addition to one or more of the preceding or following aspects, or in the alternative to some aspects, the portion of thermoplastic resin can include at least 50 percent by weight of the total weight of materials forming the lineal extrusion.

In a twentieth aspect, in addition to one or more of the preceding or following aspects, or in the alternative to some aspects, the portion of thermoplastic resin can include at least 90 percent by weight of the total weight of materials forming the lineal extrusion.

In a twenty-first aspect, in addition to one or more of the preceding or following aspects, or in the alternative to some aspects, the thermoplastic resin can include polyvinylchloride.

In a twenty-second aspect, in addition to one or more of the preceding or following aspects, or in the alternative to some aspects, wherein at least one of the bottom rail, check rail, and two opposed stiles includes a portion can include a composite including a thermoplastic resin and at least one of particles and glass fibers.

In a twenty-third aspect, in addition to one or more of the preceding or following aspects, or in the alternative to some aspects, wherein at least one of the bottom rail, check rail, and two opposed stiles includes a portion can include a composite including a thermoplastic resin, an impact modifier, and at least one of particles and glass fibers.

In a twenty-fourth aspect, in addition to one or more of the preceding or following aspects, or in the alternative to some aspects, wherein at least one of the bottom rail, check rail, and two opposed stiles includes a portion can include a thermoplastic resin without glass fibers and a portion can include a composite including a thermoplastic resin and glass fibers.

In a twenty-fifth aspect, in addition to one or more of the preceding or following aspects, or in the alternative to some aspects, the first corner key can include a polymer.

In a twenty-sixth aspect, in addition to one or more of the preceding or following aspects, or in the alternative to some aspects, the first corner key can include an injection-molded thermoplastic polymer.

In a twenty-seventh aspect, in addition to one or more of the preceding or following aspects, or in the alternative to some aspects, the impact-resistant fenestration unit can further include a top sash. The top sash can include a top rail, a check rail, and two opposed stiles. The top sash can form a first lower corner, a second lower corner, a first upper corner, and a second upper corner. A first top sash corner key can be configured to engage the top sash at the first lower corner. The first top sash corner key can include a support arm extending in a first direction onto or into a first stile of the two opposed stiles. A second top sash corner key can be configured to engage the top sash at the second lower corner, the second top sash corner key can include a support arm extending in the first direction onto or into a second stile of the two opposed stiles. A first top sash reinforcement member can be disposed on or within the first stile, the first top sash reinforcement member can include a first end and a second end, wherein the first end overlaps a portion of the support arm of the first top sash corner key, and a second top sash reinforcement member disposed on or within the second stile. The second top sash reinforcement member can include a first end and a second end, wherein the first end overlaps a portion of the support arm of the second top sash corner key.

In a twenty-eighth aspect, in addition to one or more of the preceding or following aspects, or in the alternative to some aspects, the bottom sash can include a glass subassembly and a retention member attached to the glass subassembly. The glass subassembly can include an interior laminate pane and an exterior pane, the retention member engaging at least a portion of the interior laminate pane.

In a twenty-ninth aspect, in addition to one or more of the preceding or following aspects, or in the alternative to some aspects, the fenestration unit includes a window.

In a thirtieth aspect, in addition to one or more of the preceding or following aspects, or in the alternative to some aspects, the fenestration unit includes a double-hung window.

In a thirty-first aspect, in addition to one or more of the preceding or following aspects, or in the alternative to some aspects, wherein at least one of the first stile, the second stile, the bottom rail, and the check rail includes an exterior side lineal extrusion and an interior side lineal extrusion, wherein the first reinforcement member can be disposed within a hollow portion of the exterior side lineal extrusion, the first corner key can include an exterior corner key and configured to engage the exterior side lineal extrusion.

In a thirty-second aspect, in addition to one or more of the preceding or following aspects, or in the alternative to some aspects, the exterior side lineal extrusion and an interior side lineal extrusion separated from one another with at least one of foam tape and an adhesive.

In a thirty-third aspect, in addition to one or more of the preceding or following aspects, or in the alternative to some aspects, further can include a balancer disposed within the bottom sash.

In a thirty-fourth aspect, in addition to one or more of the preceding or following aspects, or in the alternative to some aspects, a joint between the first reinforcement member and the first corner key can be configured to exhibit asymmetric directional load transmission properties.

In a thirty-fifth aspect, in addition to one or more of the preceding or following aspects, or in the alternative to some aspects, the first stile of the two opposed stiles and the bottom rail intersect appearing as a mortise and tenon joint, the first stile of the two opposed stiles and the check rail intersect appearing as a mortise and tenon joint, the second stile of the two opposed stiles and the bottom rail intersect appearing as a mortise and tenon joint, and the second stile of the two opposed stiles and the check rail intersect appearing as a mortise and tenon joint.

In a thirty-sixth aspect, in addition to one or more of the preceding or following aspects, or in the alternative to some aspects, wherein at least one of the first stile, the second stile, the bottom rail, and the check rail includes a thermal break between interior and exterior sides thereof.

In a thirty-seventh aspect, in addition to one or more of the preceding or following aspects, or in the alternative to some aspects, wherein at least one of the first stile, the second stile, the bottom rail, and the check rail includes a structure can include a first material interrupted with a second material in cross-section to create a thermal break.

In a thirty-eighth aspect, in addition to one or more of the preceding or following aspects, or in the alternative to some aspects, wherein at least one of the first stile, the second stile, the bottom rail, and the check rail includes an exterior side lineal extrusion and an interior side lineal extrusion and a thermal break between adjacent portions of the exterior lineal extrusion and the interior lineal extrusion.

In a thirty-ninth aspect, in addition to one or more of the preceding or following aspects, or in the alternative to some aspects, the impact-resistant fenestration unit exhibits impact resistance properties satisfying ASTM E1996-17 missile level A.

In a fortieth aspect, in addition to one or more of the preceding or following aspects, or in the alternative to some aspects, the impact-resistant fenestration unit exhibits impact resistance properties satisfying ASTM E1996-17 missile level D.

In a forty-first aspect, in addition to one or more of the preceding or following aspects, or in the alternative to some aspects, the impact-resistant fenestration unit exhibits HVHZ/Wind Zone 4 impact resistance and cyclical pressure properties.

In a forty-second aspect, in addition to one or more of the preceding or following aspects, or in the alternative to some aspects, the impact-resistant fenestration unit meets TAS 201 and 203 requirements.

In a forty-third aspect, in addition to one or more of the preceding or following aspects, or in the alternative to some aspects, the impact-resistant fenestration unit exhibits a U factor of less than or equal to 0.40 BTU/h*ft2*° F.

In a forty-fourth aspect, in addition to one or more of the preceding or following aspects, or in the alternative to some aspects, the impact-resistant fenestration unit exhibits a U factor of less than or equal to 0.30 BTU/h*ft2*° F.

In a forty-fifth aspect, in addition to one or more of the preceding or following aspects, or in the alternative to some aspects, the first stile lacks a metal material interconnecting an exterior window side of the first stile with an interior window side of the first stile.

In a forty-sixth aspect, in addition to one or more of the preceding or following aspects, or in the alternative to some aspects, the bottom sash can include a transparent central area and the top sash can include a transparent central area, wherein the transparent areas cover a surface area of at least 55% of the overall area defined by an outer perimeter of the frame assembly.

In a forty-seventh aspect, in addition to one or more of the preceding or following aspects, or in the alternative to some aspects, wherein metal makes up less than 30 percent by weight of the impact-resistant fenestration unit excluding hardware and fasteners.

In a forty-eighth aspect, in addition to one or more of the preceding or following aspects, or in the alternative to some aspects, the check rail of the bottom sash can include a surface defining an exterior window side top corner and an interior window side top corner, wherein a radius of curvature of the interior corner can be greater than 0.2 inches.

In a forty-ninth aspect, in addition to one or more of the preceding or following aspects, or in the alternative to some aspects, further can include a flat portion in between the exterior top corner and the interior top corner, the flat portion having a width of less than 1.5 inches.

In a fiftieth aspect, in addition to one or more of the preceding or following aspects, or in the alternative to some aspects, further configured to maintain impact-resistant properties independent of an external profile shape of extrusions forming the bottom rail, check rail, and two opposed stiles.

In a fifty-first aspect, an impact-resistant fenestration unit can be included having a frame assembly including a sill, a head jamb, and two opposed side jambs. A bottom sash can include a bottom rail, a check rail, and two opposed stiles, the bottom sash configured to move within the frame between a closed position where a bottom portion of the bottom sash engages a top of the sill and an open position where the bottom portion of the bottom sash can be separated from the top of the sill, the bottom sash forming a first lower corner, a second lower corner, a first upper corner, and a second upper corner. A first corner key can be configured to engage the bottom sash at the first lower corner, the first corner key can include a support arm extending in a first direction onto or into a first stile of the two opposed stiles. A first reinforcement member can be disposed on or within the first stile, wherein the first stile of the two opposed stiles and the bottom rail intersect appearing as a mortise and tenon joint. The impact-resistant fenestration unit can exhibit impact resistance properties satisfying ASTM E1996-17 missile level D and exhibit a U factor of less than or equal to 0.40 BTU/h*ft2*° F.

In a fifty-second aspect, an impact-resistant fenestration unit can be included having a frame assembly that can include a sill, a head jamb, and two opposed side jambs. A bottom sash can include a bottom rail, a check rail, and two opposed stiles, the bottom sash configured to move within the frame between a closed position where a bottom portion of the bottom sash engages a top of the sill and an open position where the bottom portion of the bottom sash can be separated from the top of the sill, the bottom sash forming a first lower corner, a second lower corner, a first upper corner, and a second upper corner. A first corner key can be configured to engage the bottom sash at the first lower corner. The first corner key can include a support arm extending in a first direction onto or into a first stile of the two opposed stiles. A first reinforcement member can be disposed on or within the first stile. Metal can make up less than 30 percent by weight of the impact-resistant fenestration unit excluding hardware and fasteners. The impact-resistant fenestration unit can exhibit impact resistance properties satisfying ASTM E1996-17 missile level D and a U factor of less than or equal to 0.40 BTU/h*ft2*° F.

In a fifty-third aspect, an impact-resistant fenestration unit can be included having a frame assembly that can include a sill, a head jamb, and two opposed side jambs. A bottom sash can include a bottom rail, a check rail, and two opposed stiles, the bottom sash configured to move within the frame between a closed position where a bottom portion of the bottom sash engages a top of the sill and an open position where the bottom portion of the bottom sash can be separated from the top of the sill. The bottom sash can form a first lower corner, a second lower corner, a first upper corner, and a second upper corner. A first corner key can be configured to engage the bottom sash at the first lower corner, the first corner key can include a support arm extending in a first direction onto or into a first stile of the two opposed stiles. A first reinforcement member can be disposed on or within the first stile. The check rail of the bottom sash can include a surface defining an exterior window side top corner and an interior window side top corner. A radius of curvature of the interior corner can be greater than 0.2 inches. The impact-resistant fenestration unit can exhibit impact resistance properties satisfying ASTM E1996-17 missile level D and exhibit a U factor of less than or equal to 0.40 BTU/h*ft2*° F.

In a fifty-fourth aspect, an impact-resistant fenestration unit can be included having a frame assembly can include a sill, a head jamb, and two opposed side jambs. A bottom sash can include a bottom rail, a check rail, and two opposed stiles. The bottom sash can be configured to move within the frame between a closed position where a bottom portion of the bottom sash engages a top of the sill and an open position where the bottom portion of the bottom sash can be separated from the top of the sill. The bottom sash can form a first lower corner, a second lower corner, a first upper corner, and a second upper corner. A first corner key can be configured to engage the bottom sash at the first lower corner, the first corner key can include a support arm extending in a first direction onto or into a first stile of the two opposed stiles. A first reinforcement member can be disposed on or within the first stile. The bottom sash can include a transparent central area and the top sash can include a transparent central area, wherein the transparent areas cover a surface area of at least 55% of the overall area defined by an outer perimeter of the frame assembly. The impact-resistant fenestration unit can exhibit impact resistance properties satisfying ASTM E1996-17 missile level D and a U factor of less than or equal to 0.40 BTU/h*ft2*° F.

In a fifty-fifth aspect, a corner key and reinforcement system for transferring loads in an impact resistant fenestration unit can be included having a first corner key configured to engage a sash of the fenestration unit at a corner thereof. The corner key can include a support arm. The system can also include a second corner key configured to engage the sash of the fenestration unit at a second corner thereof, the second corner key can include a support arm. The system can also include a first reinforcement member. The first reinforcement member can include a first end and a second end, wherein the first end overlaps a portion of the support arm of the first corner key and the second end overlaps a portion of the support arm of the second corner key.

In a fifty-sixth aspect, a corner key for an impact resistant fenestration unit can be included having a first support arm, wherein the first support arm extends in a first direction. The first support arm can include a first end portion, wherein the first end portion defines at least part of a channel configured to engage with a portion of a first reinforcement member. A second support arm can be included, wherein the second support arm extends in a second direction and the second direction is substantially perpendicular to the first direction.

In a fifty-seventh aspect, in addition to one or more of the preceding or following aspects, or in the alternative to some aspects, the first channel can have a lengthwise axis running parallel to a lengthwise axis of the first support arm.

In a fifty-eighth aspect, in addition to one or more of the preceding or following aspects, or in the alternative to some aspects, the channel can include an external channel.

In a fifty-ninth aspect, in addition to one or more of the preceding or following aspects, or in the alternative to some aspects, the channel can include an internal channel.

In a sixtieth aspect, in addition to one or more of the preceding or following aspects, or in the alternative to some aspects, further can include an end cap disposed on the corner key at a segment interconnecting the first support arm and the second support arm.

In a sixty-first aspect, a method of reinforcing an impact-resistant fenestration unit can be included. The method can include mounting a first corner key at a first corner of a bottom sash of the impact-resistant fenestration unit and overlapping the first corner key with a first reinforcement member. The method can include mounting a second corner key at a second corner of the bottom sash of the impact-resistant fenestration unit and overlapping the second corner key with a second reinforcement member.

In a sixty-second aspect, in addition to one or more of the preceding or following aspects, or in the alternative to some aspects, the method can further include mounting a third corner key at a third corner of the bottom sash of the impact-resistant fenestration unit and overlapping the third corner key with the first reinforcement member. The method can also include mounting a fourth corner key at a fourth corner of the bottom sash of the impact-resistant fenestration unit and overlapping the fourth corner key with the second reinforcement member.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
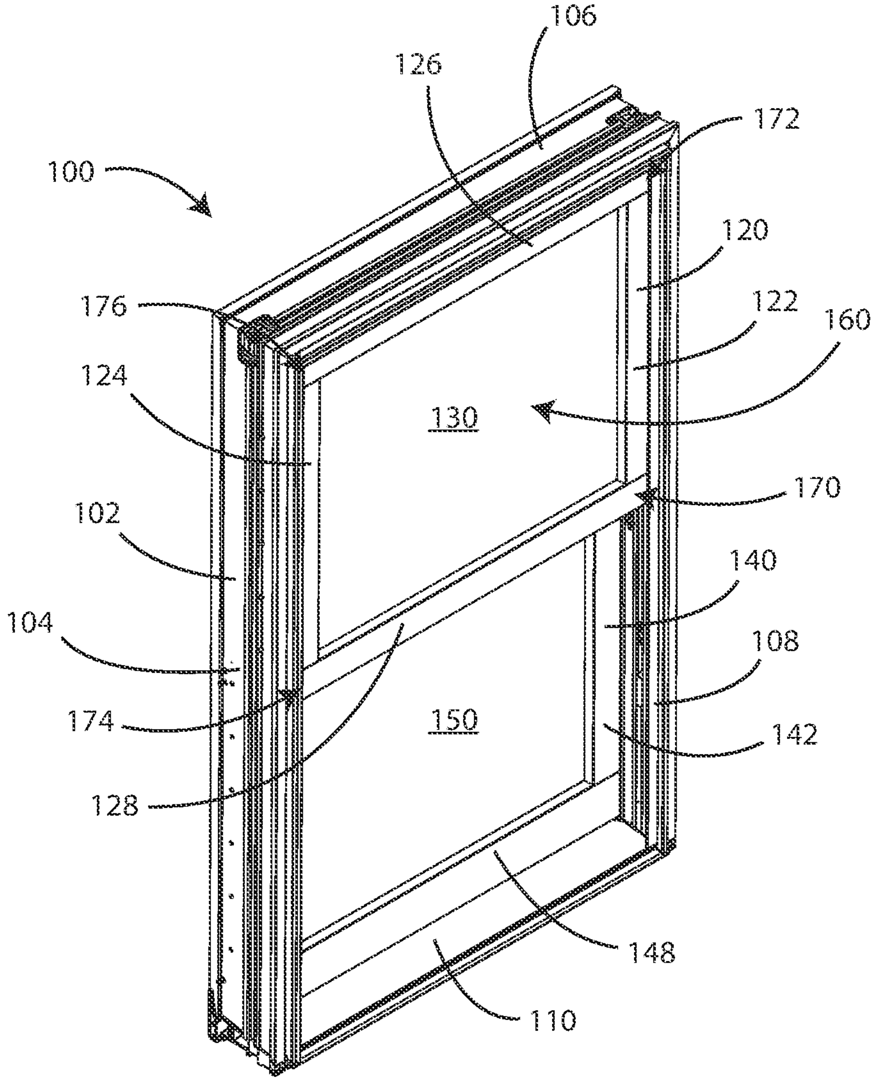
FIG. 1 is a perspective view of the exterior side of an impact-resistant fenestration unit in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Embodiments herein include fenestrations, such as windows and doors, that provide robust impact resistance while also minimizing the visibility of features required to achieve such robust impact resistance thereby promoting enhanced aesthetics. Fenestrations herein can also be formed of certain materials and physically configured to promote other measures of fenestration performance such as insulation and energy efficiency.

Various impact-resistant fenestration units herein are specifically tilt sash models, wherein a sash, such the bottom sash, can pivot about the bottom rail such that the top rail tilts or moves toward the interior side (such as in toward the interior of a building). While tilt sash models offer advantages such as making it easier for individuals to clean the exterior side of the sash(es), they can also make it more difficult to achieve desirable levels of impact resistance. However, embodiments herein can include tilt sash fenestration units that still meet impact resistance requirements.

Various impact-resistant fenestration units herein are formed using hollow lineal extrusions for rails, stiles, jambs, sills, etc. instead of solid materials such as solid wood components. While hollow lineal extrusions offer advantages in terms of efficient material usage, energy efficiency, and the like, such hollow components diminish the ability to anchor fasteners as well as transfer force. However, embodiments herein can include fenestration units formed from hollow lineal extrusions that still meet impact resistance requirements.

In various embodiments herein, reinforcement members can be provided that overlap a support arm of corner keys providing a structural configuration that can effectively transfer loads associated with projectile impacts from the reinforcement members to the corner keys. As a specific example, an impact-resistant fenestration unit is included with a frame assembly and a bottom sash. The frame assembly can include a sill, a head jamb, and two opposed side jambs. The bottom sash can include a bottom rail, a check rail, and two opposed stiles. The bottom sash can be configured to move within the frame between a closed position, where a bottom portion of the bottom sash engages the top of the sill, and an open position, where the bottom portion of the bottom sash is separated from the top of the sill. The bottom sash can form a first lower corner, a second lower corner, a first upper corner, and a second upper corner. A first corner key can be configured to engage the bottom sash at the first lower corner. The first corner key can include a support arm extending in a first direction onto or into a first stile of the two opposed stiles. The first reinforcement member can be disposed on or within the first stile, the first reinforcement member can include a first end and a second end, wherein the first end overlaps a portion of the support arm of the first corner key. The overlapping relationship between the reinforcement member and the support arm of the corner key can serve to transfer loads associated with impacts from the reinforcement member to the corner key.

Referring now to FIG. 1, a perspective view of the exterior side 160 of an impact-resistant fenestration unit 100 is shown in accordance with various embodiments herein. The impact-resistant fenestration unit 100 includes a frame assembly 102. The frame assembly 102 includes a first side jamb 104, a head jamb 106, a second side jamb 108, and a sill 110. In various embodiments the first side jamb 104, head jamb 106, second side jamb 108, and sill 110 can be lineal extrusions formed of materials described in greater detail below. In the example, of FIG. 1, the impact-resistant fenestration unit 100 is a window and, specifically, a double-hung window. However, it will be appreciated that various features described herein can also be incorporated within other types of windows as well as doors, such as patio doors. For example, features herein including reinforcement members overlapping corner keys can also be applied to designs for single-hung, casement, awning, sliding, and picture windows amongst others.

The impact-resistant fenestration unit 100 shown in FIG. 1 includes a top sash 120. The top sash 120 includes a first stile 122, a second stile 124, a top rail 126, and a check rail 128. The top sash 120 forms a first lower corner 170, a first upper corner 172, a second lower corner 174, and a second upper corner 176.

In various embodiments the first stile 122, second stile 124, top rail 126, and check rail 128 can be lineal extrusions formed of materials described in greater detail below. In the context of a double-hung window, the top sash 120 can slide up and down within the frame assembly 102. The top sash 120 includes a glass subassembly 130 therein. Details of exemplary glass subassemblies are provided in greater detail below.

The impact-resistant fenestration unit 100 also includes a bottom sash 140. The bottom sash 140 includes a first stile 142 and a second stile (not shown in this view). The bottom sash 140 also includes a bottom rail 148 and a check rail (not shown in this view). In various embodiments, the bottom rail 148 of the bottom sash 140 can be taller than the other rails, such as those of the top sash 120, and is sometimes referred to as a "tall bottom rail". The bottom sash 140 also includes a glass subassembly 150. Details of exemplary glass subassemblies are provided in greater detail below.

Figure 2:
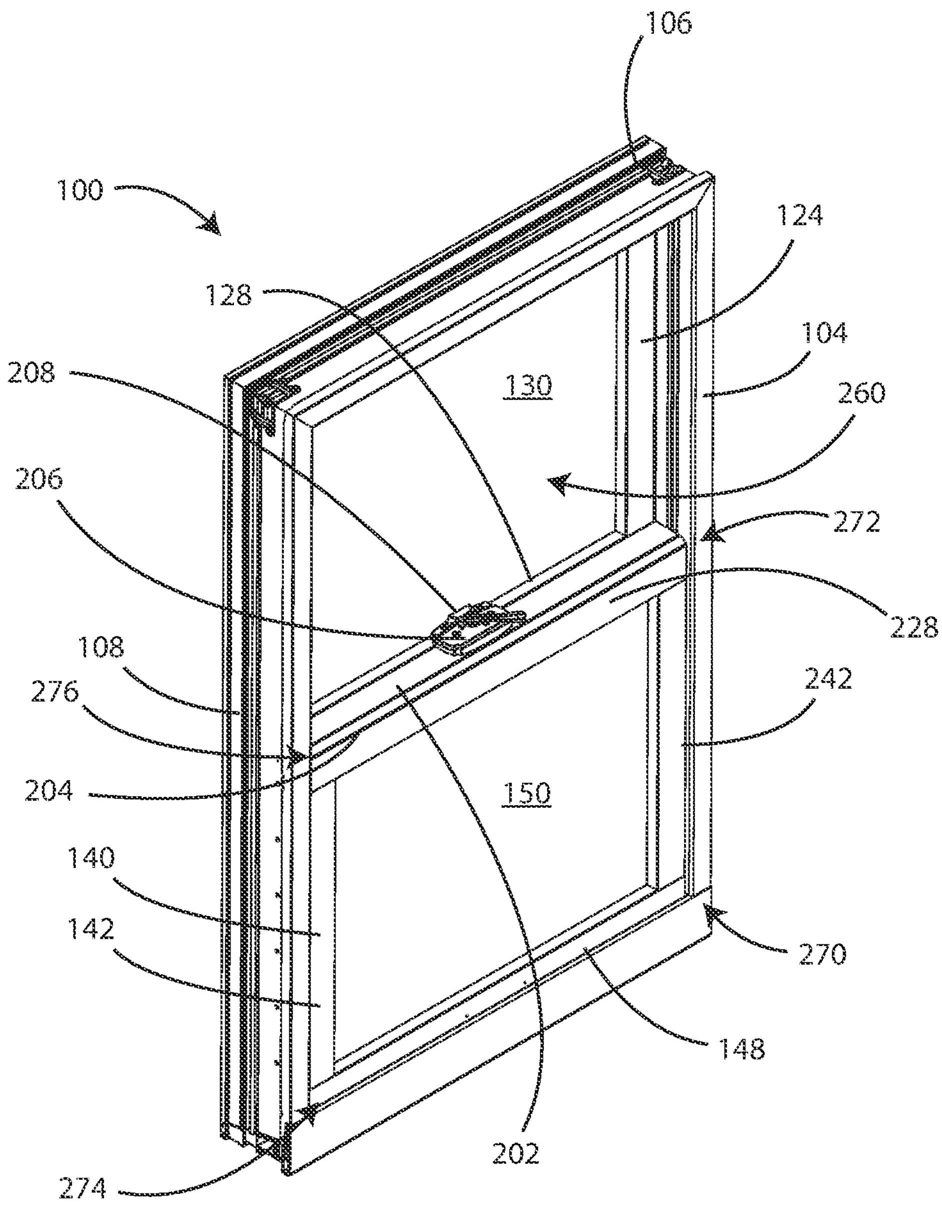
FIG. 2 is a perspective view of the interior side of an impact-resistant fenestration unit in accordance with various embodiments herein.

Referring now to FIG. 2, a perspective view of the interior side 260 of an impact-resistant fenestration unit 100 is shown in accordance with various embodiments herein. As before, the frame assembly 102 includes a first side jamb 104, a head jamb 106, a second side jamb 108, and a sill (not shown in this view). The top sash 120 includes a first stile (not shown in this view), a second stile 124, a top rail (not shown in this view), and a check rail 128.

As before, the impact-resistant fenestration unit 100 includes a bottom sash 140. The bottom sash 140 includes a bottom rail 148, a check rail 228, a first stile 142, and a second stile 242. The bottom sash includes first lower corner 270, first upper corner 272, second lower corner 274, and second upper corner 276. The bottom sash 140 is configured to move within the frame between a closed position where a bottom portion of the bottom sash engages the top of the sill 110 and an open position where the bottom portion of the bottom sash is separated from the top of the sill 110. Pins or other projections (not shown) can extend from the sides of the bottom sash 140 and fit within a channel (not shown) running vertically along an adjacent side of the side jambs to allow the bottom sash 140 to slide vertically, but still secure the bottom sash 140 within the frame assembly 102.

The impact-resistant fenestration unit 100 can also include various pieces of hardware. For example, the bottom sash 140 can includes a lock unit 206 (or sash lock) thereon, such as mounted on the bottom sash check rail 228. The top sash can include a lock keeper 208, such a mounted on the top sash check rail 128. The bottom sash check rail 228 can include a top surface including a flat portion 202 disposed between an interior window side top corner 204 and an exterior window side top corner (not shown in this view). The lock unit 206 can be mounted on the flat portion 202. In various embodiments, the flat portion 202 can have a width of less than 1.5, 1.25, 1.0 0.75, or 0.5 inches.

In various embodiments, the first stile 142 of the two opposed stiles and the bottom rail 148 intersect with the appearance of a mortise and tenon joint, such that the bottom rail 148 extends the full width of the bottom sash 140, but the opposed stiles do not extend the full height of the bottom sash 140. As such, the example of FIG. 2 stands in contrast to a design where the intersection of the stiles and rails is a mitered joint. The distinction here is significant not only for the difference in enhanced aesthetics provided for by the mortise and tenon joint but also because it impacts the length of lineal extrusions used to form the bottom sash and also reinforcement of the same. For example, in FIG. 2, since the rails extend all the way to the side edges of the bottom sash 140, they can more directly transfer loads to the frame assembly 102. However, the opposed stiles terminate at the rails and, due to a need to allow the bottom sash to pivot inward (to allow for cleaning and other maintenance), the opposed stiles are frequently not directly supported by the adjacent side jambs of the frame assembly 102. Thus, there is a greater need to provide support and a means for effective load transfer at the joint between the stiles and the rails. Embodiments herein provide for such load transfer in part by placing reinforcement members within the stiles that overlap a support arm of an adjacent corner key providing a structural configuration that can effectively transfer loads associated with projectile impacts from the stiles to the reinforcement members and on to the corner keys.

Figure 3:
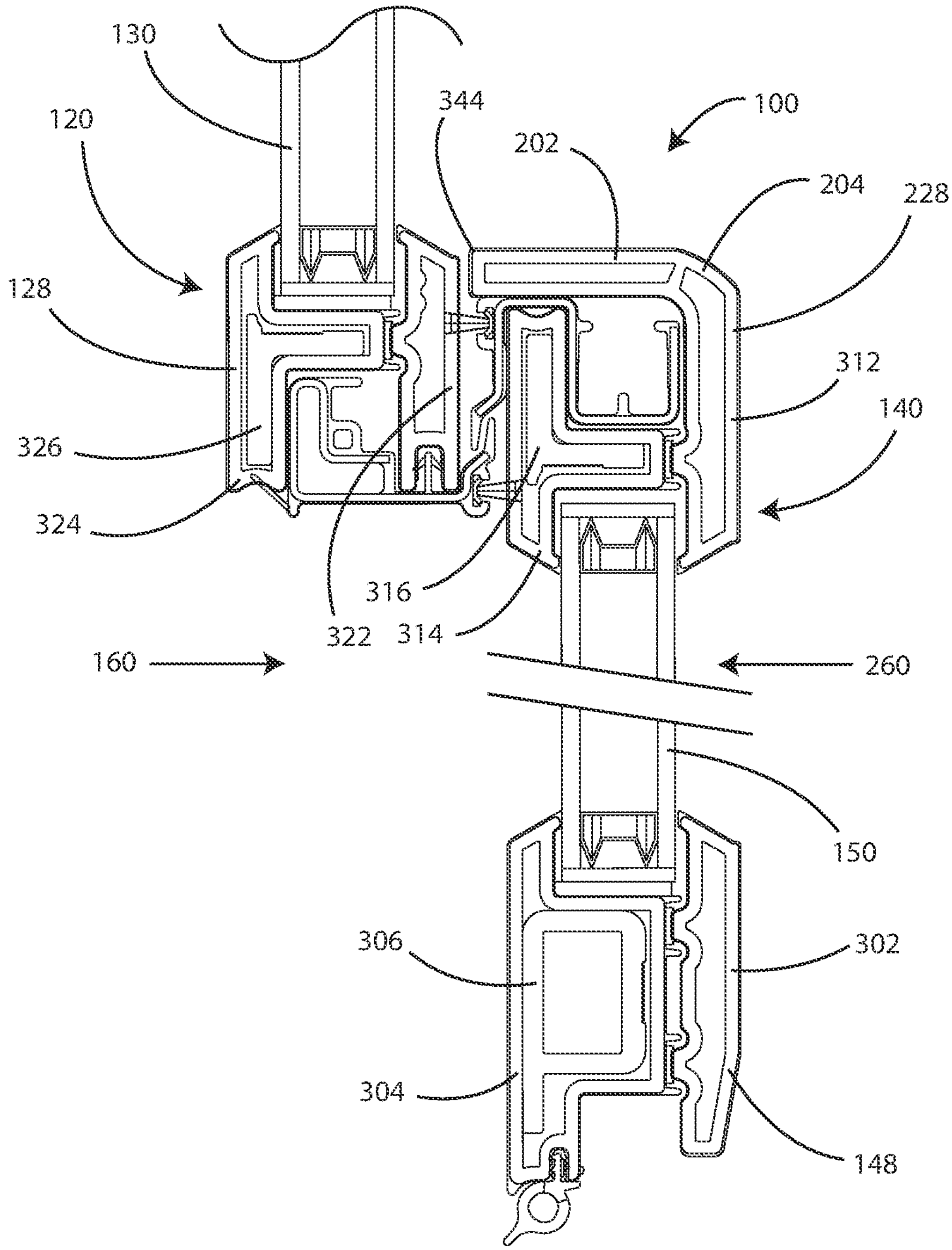
FIG. 3 is a cross-sectional view of a portion of an impact-resistant fenestration unit in accordance with various embodiments herein.

Referring now to FIG. 3, a cross-sectional view of a portion of an impact-resistant fenestration unit 100 is shown in accordance with various embodiments herein. FIG. 3 shows the interior side 260 of the impact-resistant fenestration unit 100 and the exterior side 160 thereof. The impact-resistant fenestration unit 100 includes a top sash 120 with components including a check rail 128 and a glass subassembly 130.

The check rail 128 can take on various forms and shapes. In various embodiments, the check rail 128 is formed using a lineal extrusion. In some cases, this can be a single piece lineal extrusion. However, in some cases, the check rail 128 can include two distinct lineal extrusions, three distinct lineal extrusions, or more. In the example of FIG. 3, the check rail 128 includes an interior lineal extrusion 322 and an exterior lineal extrusion 324. While not intending to be bound by theory, while thermal breaks are possible with a single extrusion, the use of at least two distinct lineal extrusions can be advantageous for thermal performance as it can readily create and/or facilitate the creation of a thermal break. While described with respect to the check rail 128, it will be appreciated that the same type of multi-part construction configuration can also be used with other components herein of the top sash, bottom sash, frame assembly, and the like.

In some embodiments, the interior lineal extrusion 322 and an exterior lineal extrusion 324 are formed of the same material, such as selected from those described in greater detail below. In other embodiments, the interior lineal extrusion 322 and an exterior lineal extrusion 324 are formed of different materials, such as each independently selected from those described in greater detail below. In some embodiments, the exterior lineal extrusion 324 is formed from a composition exhibiting greater resistance to damage (such as cracking or breaking) resulting from impacts of air borne projectiles.

The check rail 128 can also include a reinforcement member 326 therein. In some embodiments, the reinforcement member 326 can be held in place by the shape of the passage inside the lineal extrusion in which it sits. The reinforcement member 326 can be formed of various materials as described elsewhere herein.

The impact-resistant fenestration unit 100 also includes a bottom sash 140 with components including a bottom rail 148, a glass subassembly 150, and a check rail 228. As with the check rail 128 of the top sash 120, the bottom rail 148 of the bottom sash 140 in this example includes an interior side lineal extrusion 302 and an exterior side lineal extrusion 304. However, the bottom rail 148 could also be formed of a single lineal extrusion or with more than two lineal extrusions. The bottom rail 148 also includes a reinforcement member 306. In some embodiments, the reinforcement member 306 can be held in place by the shape of the passage inside the lineal extrusion in which it sits. In some embodiments, the reinforcement member 306 of the bottom rail 148 can have a different shape or configuration in cross-section. In various embodiments, the bottom rail 148 of the bottom sash 140 is taller allowing for different shapes and sizes of the reinforcement member 306 in cross-section.

In this example, the check rail 228 of the bottom sash 140 includes an interior side lineal extrusion 312 and an exterior side lineal extrusion 314. The check rail 228 of the bottom sash 140 also includes a check rail reinforcement member 316. In some embodiments, the reinforcement member 316 can be held in place by the shape of the passage inside the lineal extrusion in which it sits.

In will be appreciated that other components of the top sash and the bottom sash (such as the stiles, other rails, etc.) can also be constructed using a single-part, two-part (e.g., an interior side and exterior side lineal extrusions), or multi-part lineal extrusion designs.

In some embodiments herein where components include both interior side and exterior side lineal extrusions, reinforcement structures herein can be placed within both the interior and the exterior side lineal extrusions (e.g., multiple reinforcement structures can be used). However, in various embodiments herein where components include both interior side and exterior side lineal extrusions, reinforcement structures herein can specifically be placed within the exterior side lineal extrusions such as depicted with respect to FIG. 3. Thus, in some embodiments, reinforcement structures herein can be disposed within exterior side lineal extrusions, but not within interior side lineal extrusions.

While not intending to be bound by theory, placing reinforcement structures preferentially within exterior side lineal extrusions can offer multiple benefits. As a first example, airborne projectiles will generally originate from the exterior side of the window. Thus, providing reinforcement structures in an exterior side lineal extrusion places the reinforcement structure closer to a likely point of origination for loads associated with an impact. As a second example, providing reinforcement structures in an exterior side lineal extrusion frees up design opportunities for the interior side lineal extrusion. That is, the interior side lineal extrusion can be designed without a need to accommodate a reinforcement structure allowing for additional shapes and profiles. As such, in various embodiments herein, impact-resistant fenestration units can be configured to maintain impact-resistant properties independent of a profile shape of extrusions forming components of the top sash and/or the bottom sash, and/or components of the frame.

Interior side and exterior side lineal extrusions can be joined together in various ways. In some embodiments, such structures can be attached using mechanical fasteners. In some embodiments, such structures can be adhesively bonded together. In some embodiments, such structures can be attached using snap-fit or friction fit mechanisms. In some specific embodiments, an exterior side lineal extrusion and an interior side lineal extrusion can be attached to one another with at least one of foam tape and an adhesive.

While not intending to be bound by theory, formation of components of the top sash and the bottom sash with interior side and exterior side lineal extrusions can facilitate the formation of a thermal break therein to enhance energy efficiency. For example, formation of components with interior side and exterior side lineal extrusions can facilitate the formation of air pockets and/or a reduction in or lack of continuous material paths from the interior side of the fenestration to the exterior side of the fenestration. It will be appreciated, however, that thermal breaks can be formed in many different ways. In some embodiments, a continuous structural element passing from the exterior side to the interior side can be physically interrupted with another material in cross-section that is more resistant to conducting thermal energy (e.g., a better thermal insulator). For example, in various embodiments, a component of the frame, the bottom sash, and the top sash can include a portion interrupted with an insulating material in cross-section to create a thermal break.

Metals are generally very strong, and thus good for structural reinforcement but metals are typically also very good thermal conductors. Thus, while the use of metals can be beneficial for achieving coastal levels of structural impact requirements, their use is generally bad for thermal efficiency. As such, to improve thermal performance, in various embodiments, components of the frame, the bottom sash, and the top sash can lack a metal material interconnecting an exterior window side with an interior window side to prevent a path for substantial thermal conduction between the exterior side of fenestration and the interior side of the fenestration. In various embodiments, components of the frame, the bottom sash, and the top sash can lack a continuous metal path extending through the component (rail, stile, etc.) from a position on the interior side that is even with an interior facing surface of the glass subassembly to a position on the exterior side that is even with an exterior facing surface of the glass subassembly to prevent a path for substantial thermal conduction between the exterior side of fenestration and the interior side of the fenestration.

All things being equal, a structure that has less metal in it will be more thermally efficient than an otherwise similar structure including more metal since metals are such good thermal conductors. In various embodiments herein, metal makes up less than fixed percent by weight of the total weight of the impact-resistant fenestration unit 100, excluding the weight of metal provided by hardware and fasteners of the impact-resistant fenestration unit 100. For example, in some embodiments, the weight of metal can be less than or equal to 70 wt. %, 65 wt. %, 60 wt. %, 55 wt. %, 50 wt. %, 45 wt. %, 40 wt. %, 35 wt. %, 30 wt. %, 25 wt. %, 20 wt. %, 15 wt. %, 10 wt. %, or 5 wt. %, or can be an amount falling within a range between any of the foregoing.

In some configurations, the check rail 228 can include a top surface with a flat portion 202 disposed between an interior window side top corner 204 and an exterior window side top corner 344. The interior window side top corner 204 can include a larger (wider, less sharp) curve than the opposed exterior window side top corner 344. The larger, less sharp curve can be useful as it can prevent focusing forces associated with an impact coming from the exterior side of the window, thereby making structural failure of the check rail 228 less likely. In addition, coastal code impact testing procedures can regard opening of the lock (or sash lock) as a failure. While not intending to be bound by theory, it is believed that the larger, less sharp curve on the interior window side top corner 204 can result in less deflection of the check rail 228 making lock opening failures less likely. The larger, less sharp curve on the interior window side top corner 204 can also be useful to provide a more modern aesthetic to the look of the fenestration unit. In some embodiments, a radius of curvature of the interior corner can be greater than or equal to 0.1 inches, 0.2 inches, 0.3 inches, 0.4 inches, 0.5 inches, 0.6 inches, 0.7 inches, 0.8 inches, 0.9 inches, 1.0 inches, 1.1 inches, 1.2 inches, 1.3 inches, 1.4 inches, or 1.5 inches, or can be an amount falling within a range between any of the foregoing. The flat portion 202 of the check rail 228 can have a width can be less than or equal to 2.0 inches, 1.75 inches, 1.5 inches, 1.25 inches, 1.0 inches, 0.75 inches, or 0.50 inches, or can be an amount falling within a range between any of the foregoing.

Generally, fenestration units for coastal environments include at least one laminate pane that is designed to retain structural integrity even after substantial impacts from debris. In many cases, the laminate pane can be an interior laminate pane with an exterior pane being a non-laminate. However, in some cases, interior and exterior panes can both be laminate. In some cases, the exterior pane can be a laminate while the interior pane is not.

Laminate panes typically include a first glass layer, a second glass layer, and a polymeric material disposed between the first glass layer and the second glass layer. Embodiments herein can also include specialized components referred to as retention members that help to retain the laminate pane within the frame of the fenestration unit.

Figure 4:
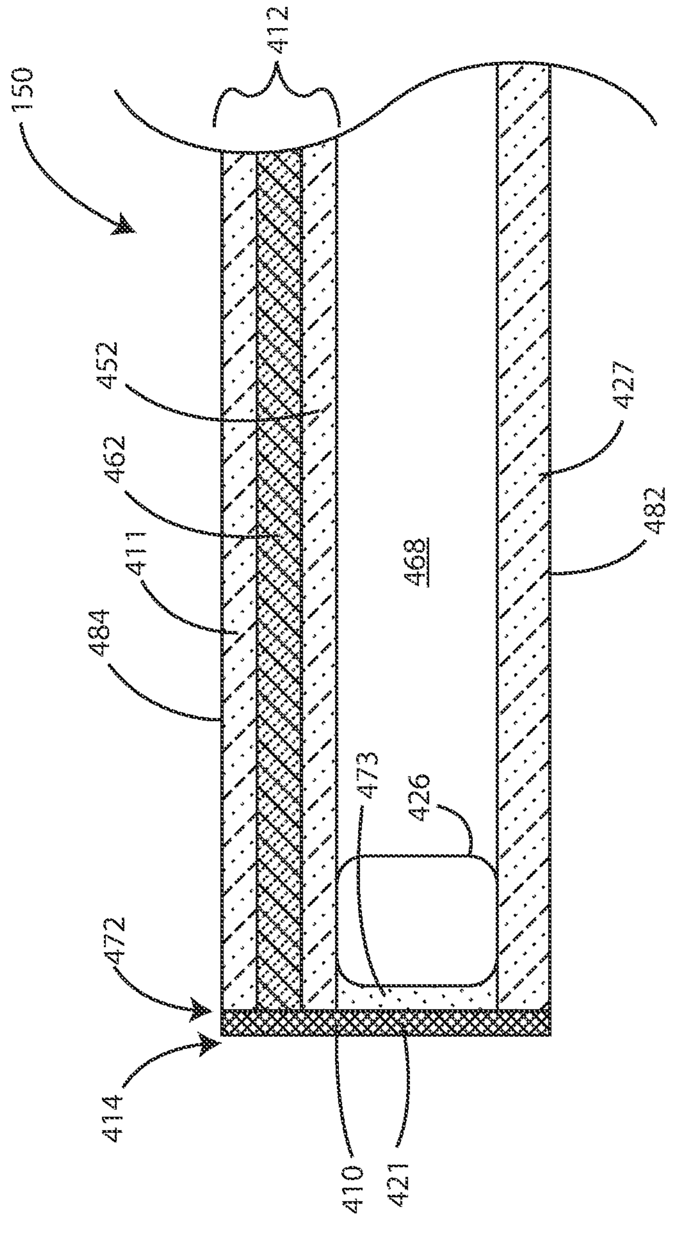
FIG. 4 is a schematic cross-sectional view of a glass subassembly in accordance with various embodiments herein.

Referring now to FIG. 4, a cross-sectional view is shown of a portion of a glass subassembly 150 in accordance with various embodiments herein. The glass subassemblies of the top sash and the bottom sash can be substantially the same. The glass subassembly 150 can include an interior laminate pane 412. The glass subassembly 150 can also include an exterior pane 427.

The glass subassembly 150 can include a proximal end 472. The glass subassembly 150 can also include an interior facing surface 484 and an exterior facing surface 482. The glass subassembly 150 also includes a sealing spacer 426. The sealing spacer 426 can serve to maintain a spacing distance between the interior laminate pane 412 and the exterior pane 427. The sealing spacer 426 can also serve to attach the interior laminate pane 412 to the exterior pane 427. The glass subassembly 150 also includes a space 468 between the interior laminate pane 412 and the exterior pane 427. The glass subassembly 150 also includes a secondary sealant 473. In various embodiments, the secondary sealant 473 can be disposed between the interior laminate pane 412 and the exterior pane 427, but on the opposite side of the sealing spacer 426 from the space 468.

The interior laminate pane 412 typically includes a first glass layer 411, a second glass layer 452, and a polymeric material 462 disposed between the first glass layer 411 and the second glass layer 452.

In various embodiments, the polymeric material 462 of the interior laminate pane 412 can include various polymers. In various embodiments, the polymeric material 462 disposed between the first glass layer 411 and the second glass layer 452 can include at least one of an ionoplast, a cast-in-place polymer, a thermoplastic, and a thermoset. In some embodiments, the polymeric material 462 can be elastomeric. In some embodiments, the polymeric material 462 can be non-elastomeric. In various embodiments, the polymeric material 462 disposed between the first glass layer 411 and the second glass layer 452 can include at least one of polyvinyl butyral (PVB), SGP (SENTRYGLAS PLUS), polyethylene terephthalate (PET), polyurethane (PUR), and ethylene-co-vinyl acetate (EVA), and hydrids/alloys/laminates/copolymers/composites thereof.

The polymeric material 462 disposed between the first glass layer 411 and the second glass layer 452 can have a thickness of various dimensions. In some embodiments, the thickness can be greater than or equal to 10, 20, 30, 45, 60, 75, or 90 mils. In some embodiments, the thickness can be less than or equal to 150, 135, 120, 105, or 90 mils. In some embodiments, the thickness can fall within a range of 30 to 150 mils, or 45 to 135 mils, or 60 to 120 mils, or 75 to 105 mils, or can be about 90 mils.

The glass layers can have thicknesses of various dimensions. In some embodiments, the thickness of the glass layers can be greater than or equal to 60, 75, 90, 120, or 150 mils. In some embodiments, the thickness can be less than or equal to 300, 200, or 150 mils. In some embodiments, the thickness can fall within a range of 60 to 300 mils, or 90 to 200 mils.

In various embodiments, the first glass layer 411 and the second glass layer 452 are the same thickness. In other embodiments, wherein the first glass layer 411 and the second glass layer 452 have different thicknesses.

In various embodiments, the polymeric material 462 may not be limited to being just between the glass layers of the interior laminate pane 412. By way of example, the polymeric material 462 can be disposed over at least a portion of a proximal end 472 of the interior laminate pane 412.

In various embodiments, the polymeric material 462 that is disposed over at least a portion of the proximal end 472 of the interior laminate pane 412 is the same as the polymeric material 462 disposed between the first glass layer 411 and the second glass layer 452. In various embodiments, the polymeric material 462 that is disposed over at least a portion of the proximal end 472 of the interior laminate pane 412 is integral with the polymeric material 462 disposed between the first glass layer 411 and the second glass layer 452. In various embodiments, the polymeric material 462 that is disposed over at least a portion of the proximal end 472 of the interior laminate pane 412 is joined to the polymeric material 462 disposed between the first glass layer 411 and the second glass layer 452 via thermal, mechanical, or chemical bonds, or other means. An interior facing surface 484 can be on the interior laminate pane 412. An exterior facing surface 482 can be on the exterior pane 427.

In various embodiments, window or door assemblies herein can include a retention member 410. In various embodiments, the retention member 410 can engage at least a portion of the interior laminate pane 412. In various embodiments, the retention member 410 having an elongation and tensile strength sufficient to provide the glass subassembly 150 with shock absorption and force dissipation protection that meets or exceeds one or more of ASTM E1886 (pressure cycling), ASTM E1996 (large and small missile impact), TAS 201 (impact), and/or TAS 203 (pressure cycling) standards.

The retention member 410 can include a base portion 421. In various embodiments, the base portion 421 can extend along and engage at least a portion of the proximal end 472 of the glass subassembly 150. In various embodiments, the base portion 421 can be of a length sufficient to project into and engage a heel bead within a channel of the upper sash or moveable lower sash to couple the retention member 410 to a frame member. In various embodiments, the base portion 421 can extend along and engage at least a portion of the proximal end 472 of the glass subassembly 150. In various embodiments, the base portion 421 can be of a width sufficient to project into and engage a bed glazing to couple the retention member 410 to a frame member.

In various embodiments, the retention member 410 includes a series of strips of a fibrous fabric or tape reinforcing material 404 applied in succession about the interior facing surface 484 and a proximal end 472 portion of the glass subassembly 150 received within the channel 414 of the frame. In various embodiments, the retention member 410 includes a body having a series of openings formed therethrough to facilitate passage of an adhesive material through the retention member. It will be appreciated that retention members used herein can include a single layer of material or can include a plurality of layers of materials.

Corner keys can be engaged with the corners of the bottom sash and/or the upper sash. Corner keys can be disposed within or on the corners and engage with the rails and/or stiles of the bottom sash and/or the upper sash. In various embodiments, the corner keys can include one or more support arms or projections which can be configured to fit within hollow portions of lineal extrusions forming the rails and/or stiles of the bottom sash and/or the upper sash. In some embodiments, the corner keys can include two support arms or projections, such as one extending in a first direction and the second extending in a second direction that is perpendicular to the first direction.

Figure 5:
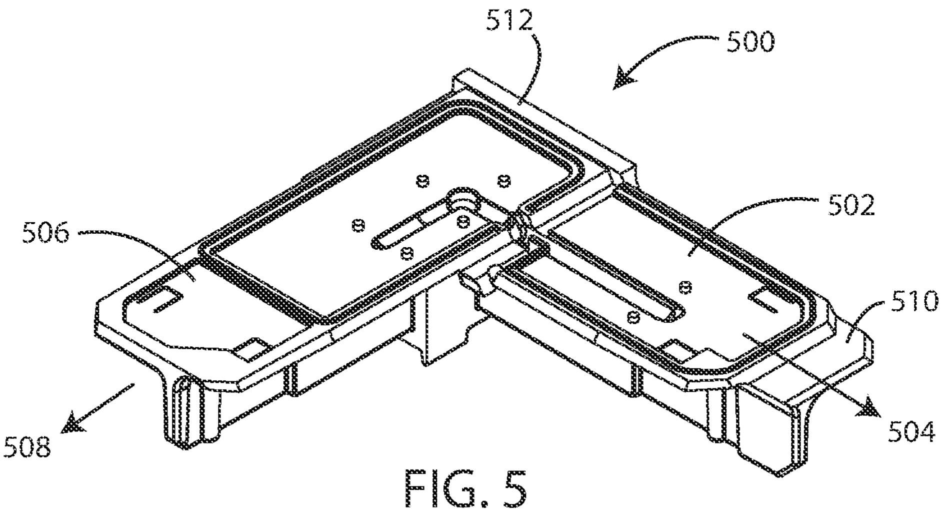
FIG. 5 is a perspective view of a corner key in accordance with various embodiments herein.

Referring now to FIG. 5, a perspective view of a corner key 500 is shown in accordance with various embodiments herein. This corner key 500 can be positioned, by way of example, at the corner between a stile and check rail of the bottom sash. The corner key 500 includes a first support arm 502 extending in a first direction 504. The corner key 500 also includes a second support arm 506 extending in a second direction 508 that is perpendicular to the first direction 504.

The corner key 500 is also shown with a stepped down portion 510 on an end of the first support arm 502. When the corner key 500 inserted within a passage or hollow portion of a lineal extrusion, the stepped down portion 510 can serve to form part of a channel or cavity along with the interior surfaces of the passage or hollow portion. This channel or cavity can be used to receive a portion of a reinforcement member. Thus, in various embodiments, a portion of a reinforcement member (not shown in this view) can fit at least over the stepped down portion 510. However, in some embodiments the corner key 500 may lack a stepped down portion 510. In some embodiments, an end of the first support arm 502 of the corner key 500 may define an internal channel to receive and overlap with an end of a reinforcement member. Corner key 500 can also include end cap 512. End cap 512 can fit tightly into a hollow channel in the cut end of a lineal extrusion forming the end of a rail, such as a top rail of the bottom sash. In some embodiments, the end cap 512 can be fitted to be flush with the cut end of the lineal extrusion into which it fits. However, in some embodiments, the end cap 512 can be fitted to be slightly proud with respect to the cut end of the lineal extrusion into which it fits.

Corner keys herein can be formed of various materials. By way of example, corner keys can be formed from polymers, metals, composites, ceramics, and the like. In some embodiments, the first corner key 500 can be formed of a polymer. In some embodiments, the first corner key 500 can be formed of a glass reinforced polymer. In various embodiments, the first corner key 500 can be formed of an injection-molded thermoplastic polymer.

Figure 6:
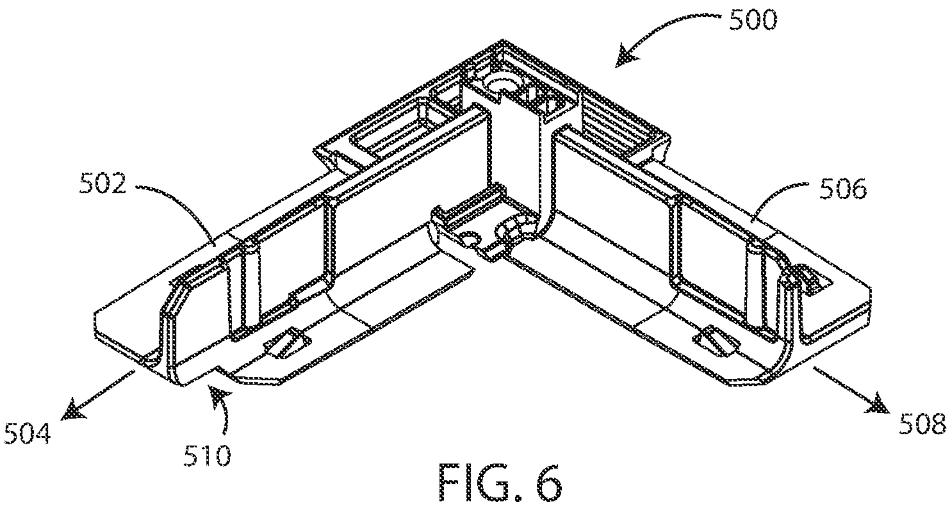
FIG. 6 is a perspective view of the opposite side of the corner key of FIG. 5 in accordance with various embodiments herein.

Referring now to FIG. 6, a perspective view of the corner key 500 of FIG. 5 is shown from the opposite side. As before, the corner key 500 includes a first support arm 502 extending in a first direction 504. The corner key 500 also includes a second support arm 506 extending in a second direction 508 that is perpendicular to the first direction 504. The corner key 500 also includes a stepped down portion 510 on an end of the first support arm 502.

Figure 7:
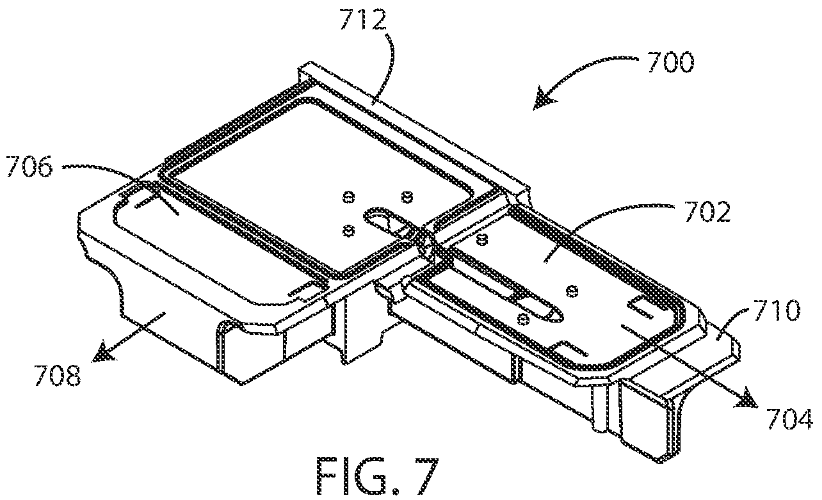
FIG. 7 is a perspective view of a corner key in accordance with various embodiments herein.

Referring now to FIG. 7, a perspective view of another corner key 700 is shown in accordance with various embodiments herein. This corner key 700 can be positioned, by way of example, at the corner between a stile and bottom rail (or tall bottom rail) of the bottom sash. The second corner key 700 includes a first corner key support arm 702 extending in a first direction 704. The second corner key 700 also includes a second support arm 706 extending in a second direction 708. Similar to as with corner key 500, corner key 700 is also shown with a stepped down portion 710. A portion of a reinforcement member (not shown in this view) can fit at least over the stepped down portion 710. Corner key 700 is largely similar to corner key 500, except that because the bottom rail of the bottom sash is generally taller than other rails the second support arm 706 thereof is shaped differently. Corner key 700 can also include end cap 712. End cap 712 can fit tightly into a hollow channel in the cut end of a lineal extrusion forming the end of a rail, such as a tall bottom rail of the bottom sash. However, in some embodiments, the end cap 712 can be fitted to be slightly proud with respect to the cut end of the lineal extrusion into which it fits.

Figure 8:
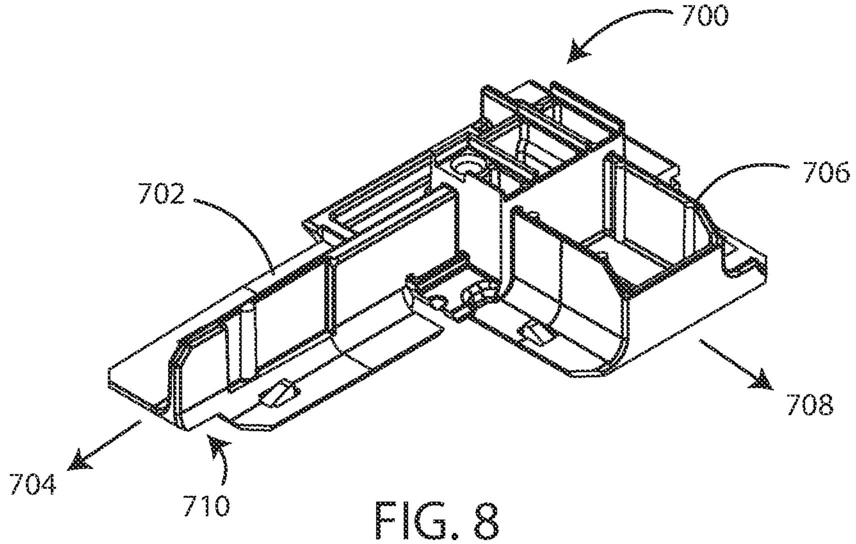
FIG. 8 is a perspective view of the opposite side of the corner key of FIG. 7 in accordance with various embodiments herein.

Referring now to FIG. 8, a perspective view of the corner key 700 of FIG. 7 is shown from the opposite side. As before, the second corner key 700 includes a first corner key support arm 702 extending in a first direction 704 and a second support arm 706 extending in a second direction 708. Corner key 700 is also shown with a stepped down portion 710.

Figure 9:
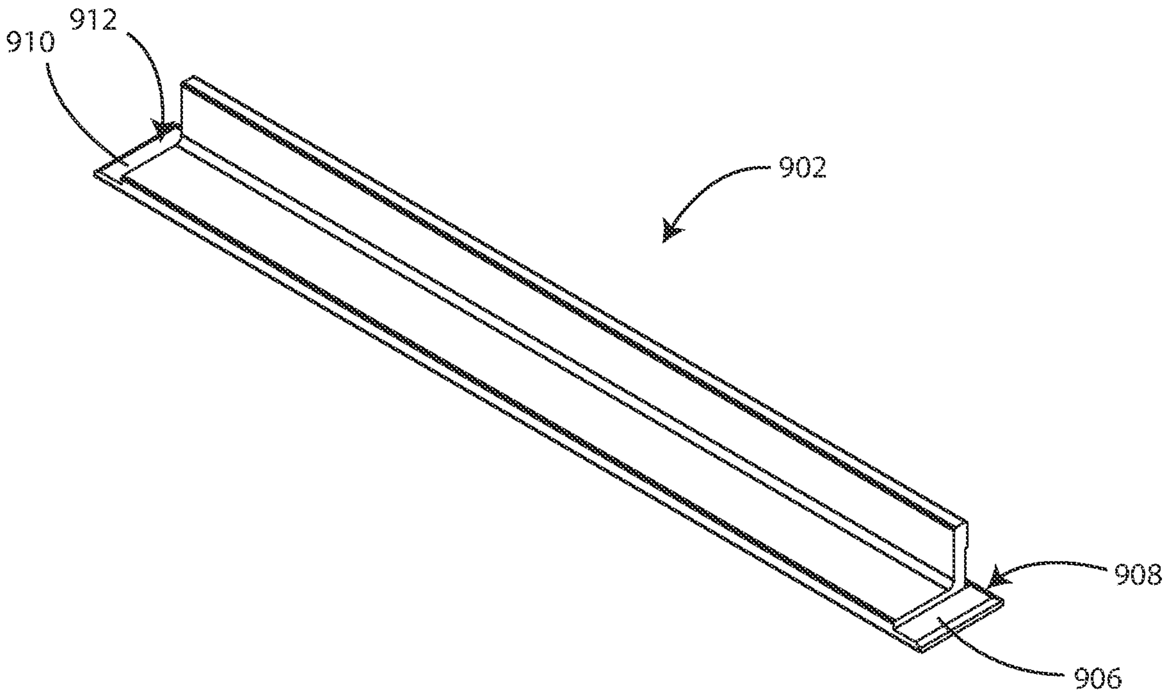
FIG. 9 is a perspective view of a reinforcement member in accordance with various embodiments herein.

Referring now to FIG. 9, a perspective view of a reinforcement member 902 is shown in accordance with various embodiments herein. The reinforcement member 902 includes a first end 908 and a second end 912. The reinforcement member 902 also includes a first overlap tab 906 at the first end 908. The stile reinforcement member also includes a second overlap tab 910 at the second end 912. The overlap tabs can take on many different sizes and shapes. The overlap tabs can be uniplanar, biplanar, or multiplanar. The overlap tabs can be substantially flat or rounded in cross-section. The overlap tabs can have a pointed or flat end. In some embodiments, the overlap tabs can have a beveled or chamfered edge on an end thereof to facilitate their insertion into an overlapping position with respect to a support arm of an adjacent corner key.

In various embodiments, the overlap tabs can have a thickness that is less than an adjacent portion of the reinforcement member. However, in other embodiments, the overlap tabs can have a thickness that is approximately the same as an adjacent portion of the reinforcement member.

Reinforcement members herein can be formed of various materials. In some embodiments, the reinforcement member can be formed of metals, composites, polymers, and the like. In some embodiments, the reinforcement member can include a metal bar. In various embodiments, the first reinforcement member can include an angled metal bar.

In various embodiments, the first end 908 of the reinforcement member 902 overlaps a portion of the support arm of an adjacent corner key. In various embodiments, the first overlap tab 906 of the first end 908 of the reinforcement member overlaps a portion of the support arm of a corner key on a side of the corner key facing an exterior side of the impact-resistant fenestration unit. Similarly, in various embodiments, the second end 912 of the reinforcement member 902 overlaps a portion of the support arm of a separate adjacent corner key. In various embodiments, the second overlap tab 910 of the second end 912 of the reinforcement member 902, overlaps a portion of the support arm of a corner key on a side of the corner key facing an exterior side of the impact-resistant fenestration unit. Since impacts are likely to originate from the exterior side of the impact-resistant fenestration unit, the load from an impact on the exterior side can pass from the reinforcement member 902 to the corner keys since the reinforcement member 902 can overlap a portion of the corner keys on the exterior side.

The length of the overlapping portion can vary. In various embodiments, the first end 908 of the first reinforcement member overlaps a portion of the support arm of the first corner key 500 by a distance that can be greater than or equal to 0.1 inches, 0.2 inches, 0.3 inches, 0.4 inches, 0.5 inches, 0.6 inches, 0.7 inches, 0.8 inches, 0.9 inches, 1.0 inches, 1.1 inches, 1.2 inches, 1.3 inches, 1.4 inches, 1.5 inches, 1.6 inches, 1.7 inches, 1.8 inches, 1.9 inches, 2.0 inches, or more, or can be an amount falling within a range between any of the foregoing.

In various embodiments, the first end 908 of the reinforcement member 902 is physically attached to the support arm of the adjacent corner key. For example, in various embodiments, the first end 908 of the first reinforcement member is adhesively bonded to the support arm of the adjacent corner key. In various embodiments, the first end 908 of the reinforcement member 902 is mechanically fastened to the support arm of the adjacent corner key.

However, in other embodiments, the first end 908 of the reinforcement member 902 overlaps the support arm of the adjacent corner key but is not attached thereto. Rather, the first end 908 of the reinforcement member 902 overlaps the support arm of the adjacent corner key forming a floating joint between the two. As described above, since impacts are likely to originate from the exterior side of the impact-resistant fenestration unit, the load from an impact on the exterior side can pass from the reinforcement member 902 to the corner keys even if the reinforcement member 902 is not physically attached to the corner key since the reinforcement member 902 can overlap a portion of the corner keys on the exterior side. In the context of a floating joint, the joint between first end 908 of the reinforcement member 902 and the corner key 500 can exhibit asymmetric directional force transmission properties. For example, if there is an impact from the exterior side transmitting a force to the reinforcement member 902, this will pass to the adjacent corner keys at a higher level than if there was a force coming from the interior side of the reinforcement member 902. The formation of a floating joint can offer substantially manufacturability advantages over a scenario where the first end 908 of the reinforcement member 902 is fastened or otherwise attached to the support arm of the adjacent corner key.

Figure 10:
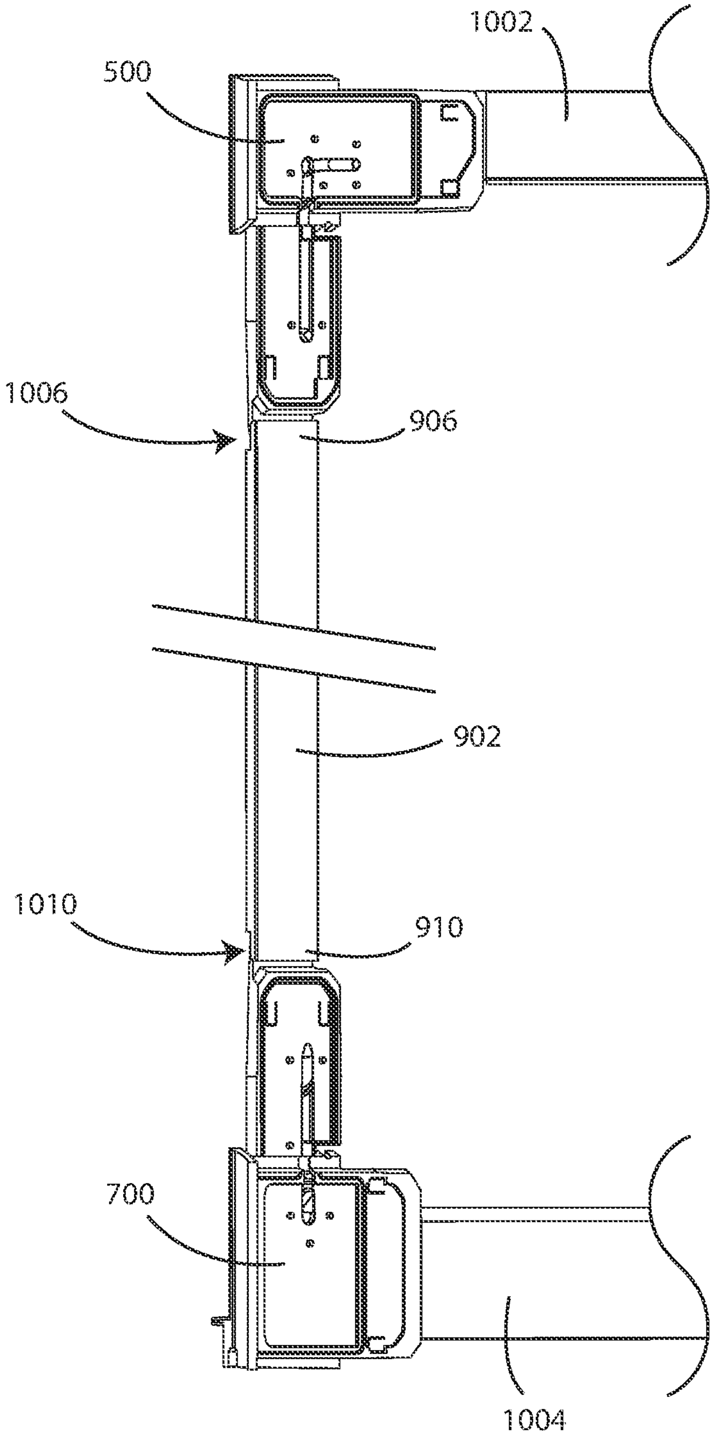
FIG. 10 is an elevation view of a reinforcement member interfacing with corner keys in accordance with various embodiments herein.

Referring now to FIG. 10, a schematic perspective view of a reinforcement member interfacing with corners keys is shown in accordance with various embodiments herein. The corner key 500 is partially overlapped by the reinforcement member 902 (and specifically the overlap tab 906 thereof) at an overlap area 1006. Similarly, the other corner key 700 is also partially overlapped by the reinforcement member 902 (and specifically the overlap tab 910 thereof) at a second overlap area 1010.

In this example, the reinforcement member 902 can be such as might be within a stile (not shown) of the upper or lower sashes. In this view, another reinforcement member 1002 such as might be within a check rail, but the reinforcement member 1002 does not overlap a portion of the corner key 500. In this view, another reinforcement member 1004 such as might be within a bottom rail is also shown, but the reinforcement member 1004 does not overlap a portion of the corner key 700.

Figure 11:
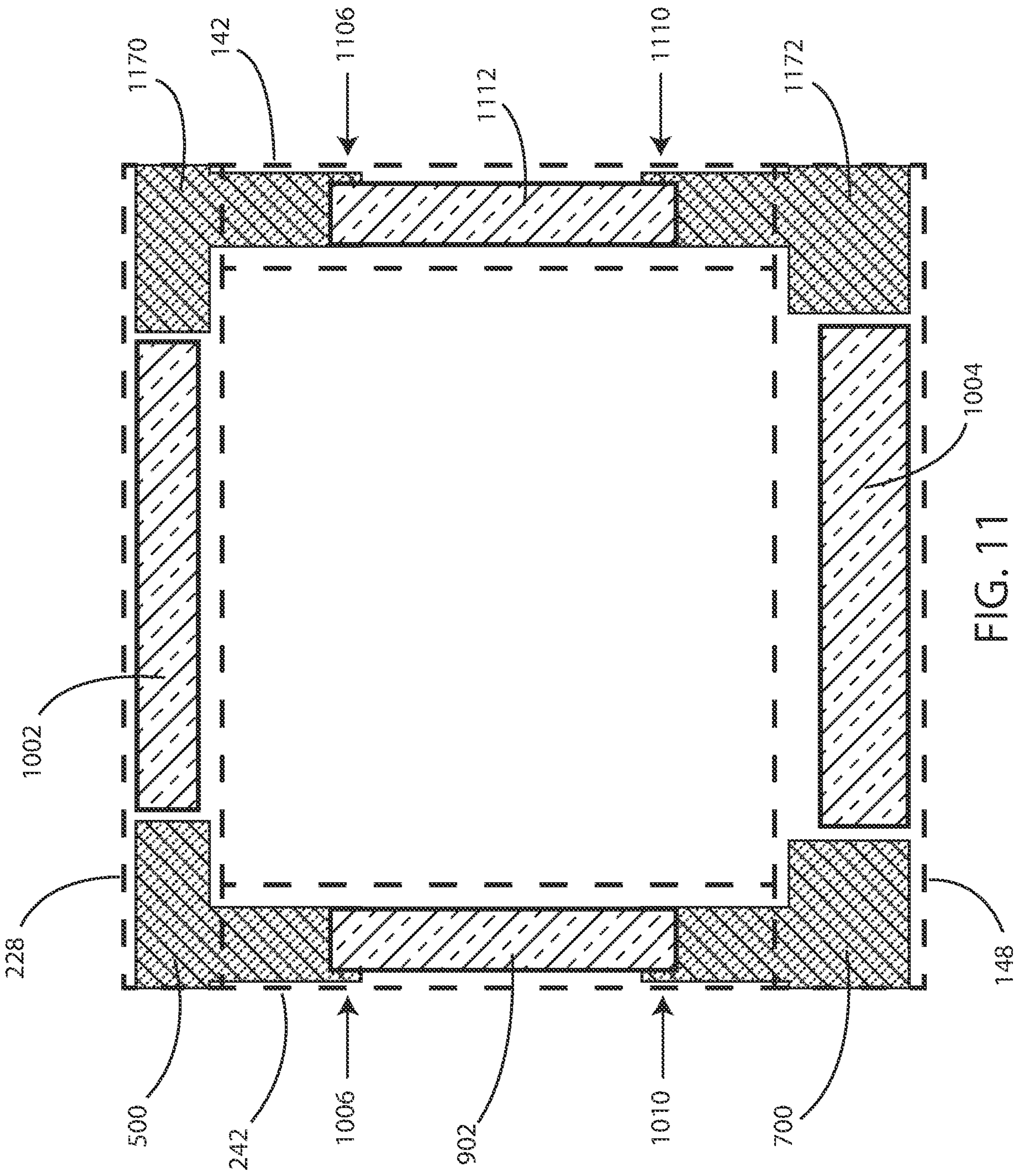
FIG. 11 is a schematic view of reinforcement members interfacing with corner keys in accordance with various embodiments herein.

The structure of sashes herein can include some designs where all reinforcement members overlap with adjacent corner keys and some designs where only some reinforcement members overlap with adjacent corner keys. Referring now to FIG. 11, a schematic view of reinforcement members interfacing with corner keys inside of a sash is shown in accordance with various embodiments herein. In this schematic view, reinforcement members and corner keys can be seen within components of the bottom sash including bottom rail 148, sash check rail 228, first stile 142, and second stile 242. FIG. 11 shows a first corner key 500, a second corner key 700, a third corner key 1170, and a fourth corner key 1172 engaging with the corners of the bottom sash. A first reinforcement member 902 is disposed within the second stile 242, a second reinforcement member 1002 is disposed within the sash check rail 228, a third reinforcement member 1004 is disposed within the bottom rail 148, and a fourth reinforcement member 1112 are disposed within the first stile 142. The first reinforcement member 902 overlaps corner key 500 at an overlap area 1006. The reinforcement member 902 also overlaps corner key 700 at a second overlap area 1010. Similarly, the fourth reinforcement member 1112 overlaps third corner key 1170 at another overlap area 1106. The fourth reinforcement member 1112 also overlaps the fourth corner key 1172 at another overlap area 1110.

However, in the embodiment of FIG. 11, the second reinforcement member 1002 does not overlap overlaps first corner key 500 or third corner key 1170. Similarly, the third reinforcement member 1004 does not overlap second corner key 700 or fourth corner key 1172. In other embodiments, those same elements can overlap with one another. While not intending to be bound by theory, the creation of overlaps is more costly and complex. Thus, in various embodiments, overlaps may be created only where they are needed to create desired levels of impact resistance. Further, in some embodiments, second reinforcement member 1002 and third reinforcement member 1004 can even be omitted.

Figure 12:
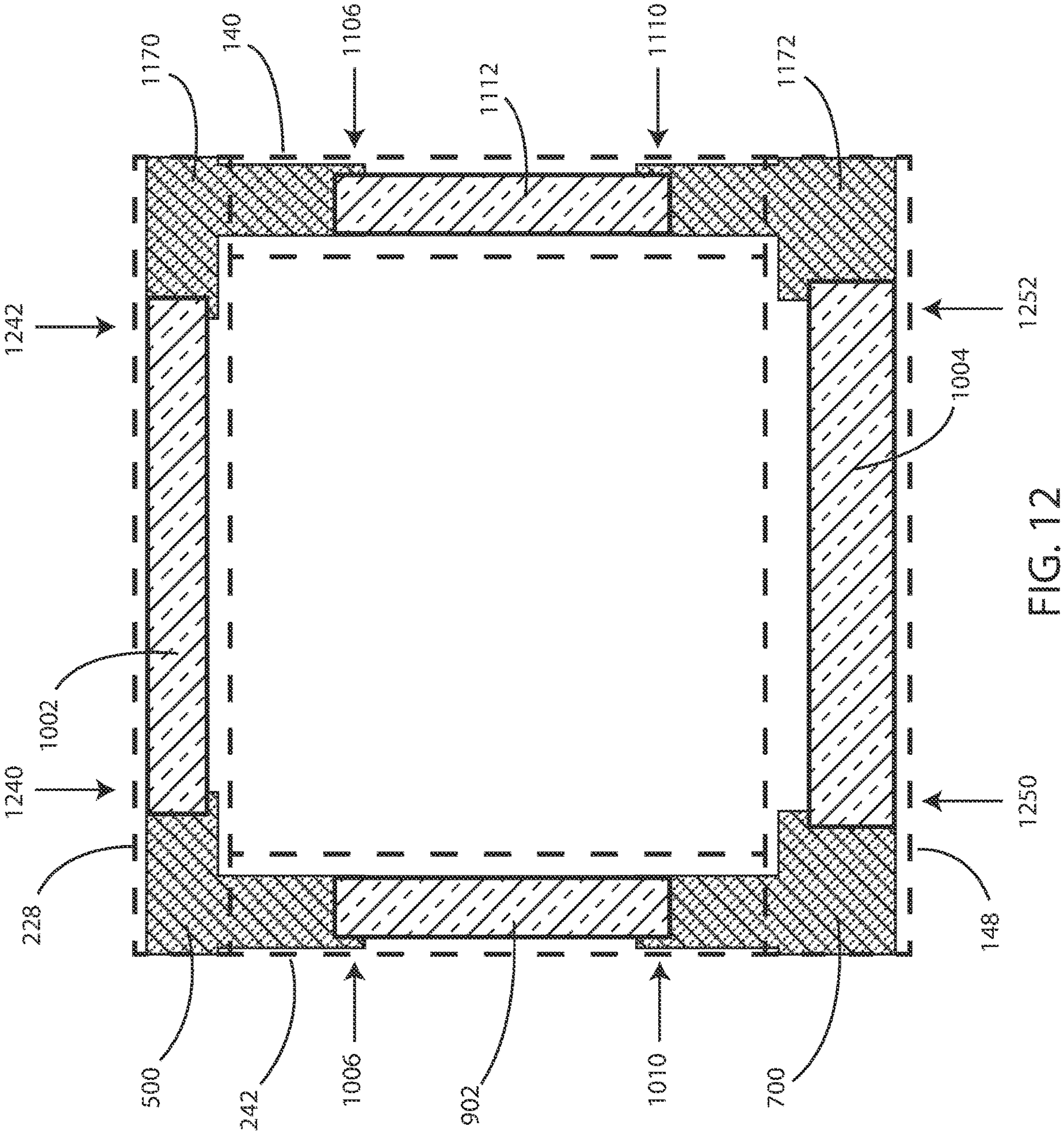
FIG. 12 is a schematic view of reinforcement members interfacing with corner keys in accordance with various embodiments herein.

Referring now to FIG. 12, a schematic view of reinforcement members interfacing with corner keys is shown in accordance with various embodiments herein. FIG. 12 is generally similar to FIG. 11. However, in FIG. 12 it can be seen that the second reinforcement member 1002 overlaps the first corner key 500 at an overlap area 1240. Further, the second reinforcement member 1002 overlaps the third corner key 1170 at an overlap area 1242. The third reinforcement member 1004 overlaps the second corner key 700 at an overlap area 1250 and the fourth corner key 1172 at another overlap area 1252.

Figure 13:
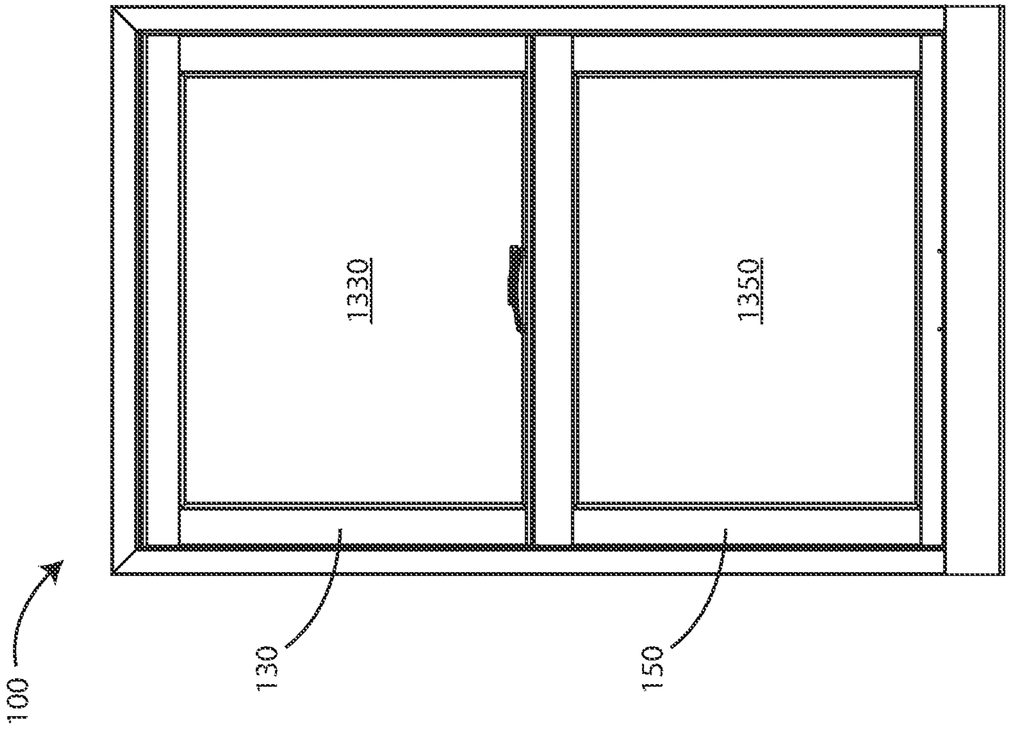
FIG. 13 is an elevation view of an interior side of an impact-resistant fenestration unit in accordance with various embodiments herein.

Embodiments herein can provide high levels of impact resistance while also minimizing or eliminating the visibility (while the fenestration is closed) of hardware components required to achieve the same. As such, embodiments herein can offer desirable sight lines along with remarkable impact resistance. Referring now to FIG. 13, an elevation view is shown of an impact-resistant fenestration unit in accordance with embodiments therein. The impact-resistant fenestration unit 100 is shown as a double-hung unit with a top sash 120 and a bottom sash 140. The top sash 120 includes a transparent central portion 1330 and the bottom sash 140 also includes a transparent central portion 1350. The hardware to provide desirable levels of impact performance is effectively hidden from view.

Figure 14:
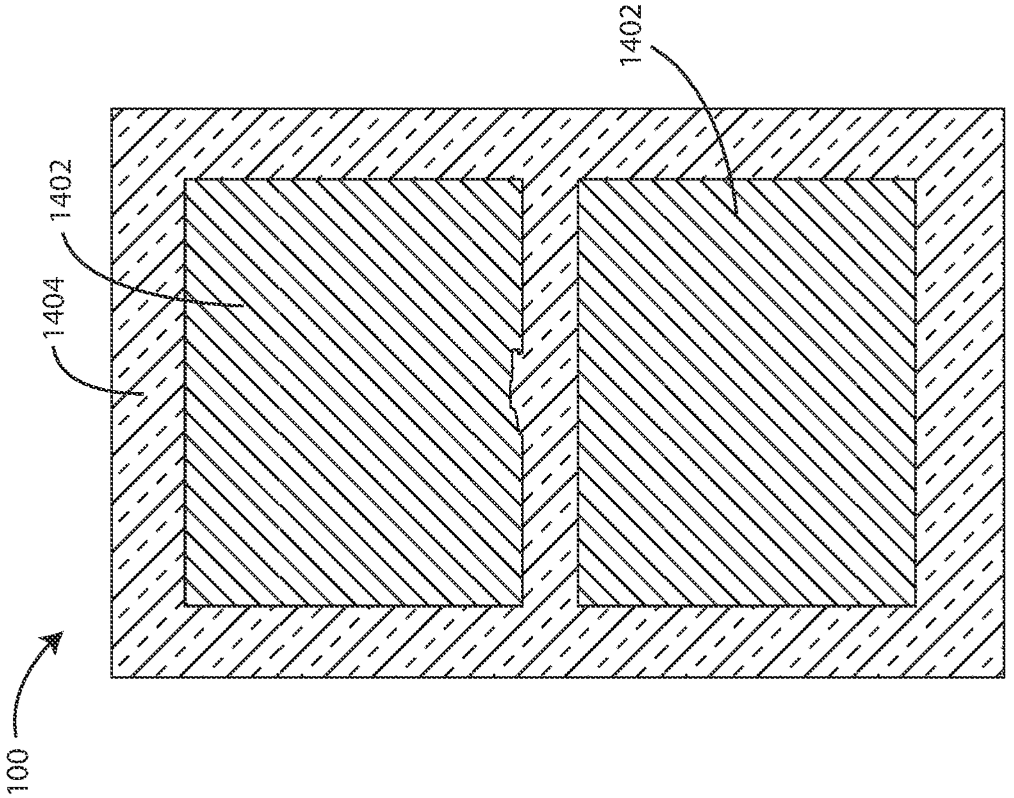
FIG. 14 is a diagram of an interior side of an impact-resistant fenestration unit showing transparent portions thereof in accordance with various embodiments herein.

Embodiments herein can provide high levels of impact resistance while maximizing the area of transparent space relative to the overall area of the fenestration unit. Referring now to FIG. 14, a diagram is shown of an interior side of an impact-resistant fenestration unit showing transparent portions thereof in accordance with various embodiments herein. In specific, the fenestration unit 100 includes transparent areas 1402 (not including any possible grills that might be present) as well as non-transparent area 1404. The proportion of transparent area to the total area of the fenestration (e.g., the sum of both transparent and non-transparent areas) calculated as a percent can be higher than 50%, 55%, 60%, 65%, 70%, 75%, 80%, or more, or an amount falling within a range between any of the foregoing.

Methods

Many different methods are contemplated herein, including, but not limited to, methods of making impact-resistant fenestration units, methods of using impact-resistant fenestration units, and the like.

In an embodiment, a method of reinforcing an impact-resistant fenestration unit is included. The method can include mounting a first corner key at a first corner of a bottom sash of the impact-resistant fenestration unit and overlapping the first corner key with a first reinforcement member. The method can also include mounting a second corner key at a second corner of the bottom sash of the impact-resistant fenestration unit and overlapping the second corner key with the first reinforcement member.

The method can also include mounting a third corner key at a third corner of the bottom sash of the impact-resistant fenestration unit and overlapping the third corner key with the first reinforcement member and mounting a fourth corner key at a fourth corner of the bottom sash of the impact-resistant fenestration unit and overlapping the fourth corner key with the second reinforcement member.

The order of operations described herein can vary depending on the particular manufacturing process used. In some embodiments, operations of mounting a corner key and overlapping the corner key can happen simultaneously. In some embodiments, reinforcement members can be placed within lineal extrusions first and then corner keys can be attached to the ends of lineal extrusions such that non-overlapping joints between reinforcement members and corner keys are created first followed by overlapping joints.

In some scenarios, corner keys can be fixed into place within a hollow portion of an extruded lineal using an adhesive. In some scenarios, corner keys can be fixed into place within a hollow portion of an extruded lineal using a mechanical fastener. In some scenarios, corner keys can be fixed into place within a hollow portion of an extruded lineal using a friction fit or snap fit mechanism.

Performance Qualities

Various embodiments herein include impact-resistant fenestration units that can achieve various performance standards. Further details about the performance standards are provided as follows. However, it will be appreciated that this is merely provided by way of example.

In some embodiments, the impact-resistant fenestration unit exhibits impact resistance properties satisfying ASTM E1996-17 and/or Florida TAS Standards. In some embodiments, impact-resistant fenestration units herein can withstand the impact of a large projectile, such as in the ASTM/E1886-19/E1996-17 large missile test or TAS 201 and/or 203 large missile test for High Velocity Hurricane Zone. For example, impact-resistant fenestration units herein can withstand a 2×4 weighing approximately 9 pounds shot from a compressed-air cannon at a velocity of 50 feet per second while maintaining structural integrity (such as no tears in the window permitting a 3 inch sphere to pass through and no tears larger than 5 inches in length or no tears longer than 5 inches and wider than $1/16^{th}$ of an inch). In some embodiments, impact-resistant fenestration units herein can withstand the impact of a small projectile. For example, impact-resistant fenestration units herein can withstand a ball bearing weighing approximately 2 grams traveling at a velocity of 130 feet per second without allowing penetration of the same. In some embodiments, impact-resistant fenestration units herein can withstand the impact of projectiles according to ASTM E1886-19 missile levels A, B, C, D, and/or E. In some embodiments, impact-resistant fenestration units herein can withstand the impact of projectiles according to ASTM E1886-19 missile levels A and D.

In various embodiments, the impact-resistant fenestration unit exhibits High-Velocity Hurricane Zones (HVHZ) Wind Zone 4 impact resistance properties. In some embodiments, impact-resistant fenestration units herein can withstand HVHZ High-Velocity Hurricane Zones (HVHZ) Wind Zone 4 cyclic pressure differentials. In some embodiments herein, the impact-resistant fenestration unit can satisfy performance requirements as specified in AAMA/WDMA/CSA 101/I.S.2/A440-2017.

In various embodiments, the impact-resistant fenestration unit exhibits exceptional thermal insulation properties. In various embodiments, impact-resistant fenestration units herein exhibit a U factor of less than or equal to 0.50 BTU/h*ft$^{2}$*° F., less than or equal to 0.45 BTU/h*ft$^{2}$*° F., less than or equal to 0.40 BTU/h*ft$^{2}$*° F., less than or equal to 0.35 BTU/h*ft$^{2}$*° F., or less than or equal to 0.30 BTU/h*ft$^{2}$*° F.

Lineal Extrusion Materials

Various embodiments herein can be formed with lineal extrusions. For example, sills, jambs, rails, stiles, and the like can be formed from lineal extrusions. Further details about lineal extrusion materials are provided as follows. However, it will be appreciated that this is merely provided by way of example and that further variations are contemplated herein.

In various embodiments, the bottom rail, check rail, and two opposed stiles can be formed from a lineal extrusion that can include a thermoplastic resin. In various embodiments, the sill, side jambs, and top jamb can be formed from a lineal extrusion that can include a thermoplastic resin.

In some embodiments, the portion of thermoplastic resin can include at least 50 percent by weight of the total weight of materials forming the lineal extrusion other than processing aids can be equal to 40, 45, 50, 55, 60, 65, 70, 75, 80, 85, 90, 95, or 100 percent by weight, or can be an amount falling within a range between any of the foregoing. Exemplary thermoplastic resins are described in greater detail below, but in various embodiments, the thermoplastic resin can include polyvinylchloride. In some embodiments, the lineal extrusion can be a composite, such as a composite of thermoplastic resin and glass fibers. For example, in some embodiments at least one of the bottom rail, check rail, and two opposed stiles includes a portion can include a composite including a thermoplastic resin and glass fibers.

In various embodiments, at least one of the bottom rail, check rail, and two opposed stiles includes a portion including a thermoplastic resin, but without glass fibers, along with a portion including a composite including a thermoplastic resin and glass fibers.

In some embodiments, composite materials herein can include a polymeric resin, fibers, and at least one of particles and an impact modifier. Many different specific formulations are contemplated and details of exemplary compositions are described in U.S. patent application Ser. No. 15/439,586 and Ser. No. 15/439,603, the content of which is herein incorporated by reference. However, in some embodiments, the composite material can include a polymer resin, fibers, and, in some cases, at least one component selected from the group consisting of at least 1% by weight particles and at least 5 phr impact modifier. However, in other embodiments, the composite material may only include a polymer resin and fiber, lacking particles and/or an impact modifier. Details of these components are described in more detail below.

Some embodiments of composite materials herein have a remarkably high modulus of elasticity. For example, in various embodiments such materials can have a modulus of elasticity of 800,000, 900,000, 1,000,000, 1,100,000, 1,200,000, 1,300,000, 1,400,000, 1,500,000, 1,600,000, 1,700,000, 1,800,000, 1,900,000, 2,000,000, 2,200,000, 2,400,000, 2,600,000, 2,800,000, 3,000,000, 3,500,000 or 4,000,000 psi, or within a range between any of the foregoing. By comparison, some embodiments of composites with the same or similar polymeric resins, but lacking fibers and impact modifier have a modulus of elasticity of about 850,000. By way further comparison, non-composite vinyl (PVC) compositions can have a modulus of elasticity of 300,000 to 500,000 psi. In various embodiments, an extruded article can include a second composition, which can be an advanced composite herein, having a modulus of elasticity at least 50,000 psi higher than a first composition, wherein the second composition is different than the first composition. In some embodiments, the second composition can have a modulus of elasticity at least 100,000, 250,000, 500,000, 750,000, 1,000,000, 1,250,000, 1,500,000, 1,750,000, 2,000,000, or 2,500,000 psi higher than the first composition. In some embodiments, the second composition can have a modulus of elasticity at least 10, 20, 30, 40, 50, 60, 70, 80, 100, 200, 300, 400, 500, 600, 700, or 800 percent higher than the first composition.

Descriptions herein of exemplary particles are only applicable for the description of embodiments herein and not for other patents or patent applications of the applicant and/or inventors unless explicitly stated to the contrary.

Particles herein can include both organic and inorganic particles. Such particles can be roughly spherical, semi-spherical, block-like, flat, needle-like (acicular), plate-like (platy), flake-like (flaky), or other shape forms. Particles herein can have substantial variation. As such, the particles added to compositions in some embodiments can form a heterogeneous mixture of particles. In other embodiments, the particles can be substantially homogeneous.

In some embodiments, the particles used with compositions herein can have an aspect ratio of between about 15:1 and about 1:1. In some embodiments, particles herein can have an aspect ratio of between about 10:1 and about 1:1. In some embodiments, particles herein can have an aspect ratio of between about 8:1 and about 1:1. In some embodiments, particles herein can have an aspect ratio of between about 7:1 and about 1:1. In some embodiments, particles herein can have an aspect ratio of between about 6:1 and about 1:1. In some embodiments, particles herein can have an aspect ratio of between about 5:1 and about 1:1. In some embodiments, particles herein can have an aspect ratio of between about 4:1 and about 1:1. In some embodiments, particles herein can have an aspect ratio of between about 3:1 and about 1:1. In some embodiments, particles herein can have an aspect ratio of between about 2:1 and about 1:1. Such aspect ratios can be assessed by first taking the largest dimension of the particle (major axis) and then comparing it with the next largest dimension of the particle that is perpendicular to the major axis.

In various embodiments, the particles can be, on average, from about 0.01 mm to about 8 mm in their largest dimension (or major axis or characteristic dimension). In various embodiments, the particles can be from about 0.25 mm to about 5 mm in their largest dimension. In various embodiments, the particles can have an average size of about 0.1 mm to about 2.5 mm in their largest dimension. In various embodiments, the particles can have an average size of about 0.18 mm to about 0.6 mm in their largest dimension. In various embodiments, the particles can have an average size of greater than about 0.6 mm in their largest dimension. For example, in various embodiments, the particles can have an average size of about 0.6 mm to about 3.0 mm in their largest dimension. In various embodiments, the particles can have an average size of about 0.5 mm to about 2.5 mm in their largest dimension. In various embodiments, the particles can have an average size of about 1 mm to about 2 mm in their largest dimension.

In some embodiments, the particles can have an average size of their largest dimension falling within a range wherein the lower bound and the upper bound can be any of the following sizes (provided that the upper bound is greater than the lower bound): 0.01 mm, 0.02 mm, 0.03 mm, 0.05 mm, 0.07 mm, 0.09 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.2 mm, 2.4 mm, 2.6 mm, 2.8 mm, 3.0 mm, 3.5 mm, 4.0 mm, 4.5 mm, 5.0 mm, 5.5 mm, 6.0 mm, 6.5 mm, 7.0 mm, and 8.0 mm.

In some embodiments, the particles are organic particles and can have an average size of their largest dimension falling within a range wherein the lower bound and the upper bound can be any of the following sizes (provided that the upper bound is greater than the lower bound): 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.2 mm, 2.4 mm, 2.6 mm, 2.8 mm, and 3.0 mm.

In some embodiments, the particles are inorganic particles and can have an average size of their largest dimension falling within a range wherein the lower bound and the upper bound can be any of the following sizes (provided that the upper bound is greater than the lower bound): 0.01 mm, 0.02 mm, 0.03 mm, 0.05 mm, 0.07 mm, 0.09 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.2 mm, 2.4 mm, 2.6 mm, 2.8 mm, and 3.0 mm.

As referenced above, aspect ratios can be assessed by first taking the largest dimension of the particle (major axis) and then comparing it with the next largest dimension of the particle along an axis (Y axis) that is perpendicular to the major axis (X axis). The depth or Z axis measure (Z axis) can be measured along an axis that is perpendicular to both the X and Y axes used to specify the aspect ratio. In some embodiments, particles herein can have an average or maximum depth or Z axis measure in the context of the aspect ratios described above that is equal to at least about 0.1, 0.2, 0.3, 0.4, 0.5, 0.6, 0.7, 0.8, 0.9, or 0.95 of the smaller of the two dimensions used to assess aspect ratio.

It will be appreciated that the dimensions of particles can change during processing steps associated with the creation of extruded articles including, but not limited to, steps of compounding and/or extruding. As such, in some embodiments the foregoing measures of aspect ratio and size can be as measured before such processing steps or as measured after such processing steps.

It will be appreciated that in many embodiments not every particle used will be identical in its dimensions and, as such, the foregoing dimensions can refer to the average (mean) of the particles that are used.

Particles herein can include materials such as polymers, carbon, organic materials, inorganic materials, composites, or the like, and combinations of these. Polymers for the particles can include both thermoset and thermoplastic polymers. Inorganic particle materials can include, but are not limited to silicates. Inorganic particle materials can specifically include, but are not limited to, glass beads, glass bubbles, minerals such as mica and talc, and the like.

Particles herein can specifically include organic particles. Particles herein can specifically include particles comprising substantial portions of lignin, hemicellulose and cellulose (lignocellulosic materials), such as wood particles or wood flour. Wood particles can be derived from hardwoods or softwoods. In various embodiments, the wood particles can have a moisture content of less than about 8, 6, 4, or 2 percent.

In various embodiments, the wood particles can be a heterogeneous mixture of wood particles, wherein at least about 50, 60, 70, 80, 90, or 95 weight percent of the particles are 80 Mesh or larger (or 80 sieve size—corresponding to a pore size of 0.177 mm and a particle size of approximately 0.180 mm).

In various embodiments, the wood particles can be a heterogeneous mixture of wood particles, wherein at least about 50, 60, 70, 80, 90, or 95 weight percent of the particles are 80 Mesh or larger (or 80 sieve size—corresponding to a pore size of 0.177 mm and a particle size of approximately 0.180 mm) and less than 9 Mesh (or 10 sieve size—corresponding to a pore size of 2.00 mm).

In various embodiments, the wood particles can be a heterogeneous mixture of wood particles, wherein at least about 50, 60, 70, 80, 90, or 95 weight percent of the particles are 28 Mesh or larger (or 30 sieve size—corresponding to a pore size of 0.595 mm and a particle size of approximately 0.6 mm).

In various embodiments, the wood particles can be a heterogeneous mixture of wood particles, wherein at least about 50, 60, 70, 80, 90, or 95 weight percent of the particles are 28 Mesh or larger (or 30 sieve size—corresponding to a pore size of 0.595 mm and a particle size of approximately 0.6 mm) and less than 9 Mesh (or 10 sieve size—corresponding to a pore size of 2.00 mm).

Other biomaterials or other organic materials may also be used as particles. As used herein, the term "biomaterial" will refer to materials of biological origin, such as wood fiber, hemp, kenaf, bamboo, rice hulls, and nutshells. More generally, other lignocellulose materials resulting from agricultural crops and their residues may also be used as particles.

In some embodiments, particles herein can include inorganic materials such as metal oxide particles or spheres, glass particles, or other like materials. These particles may be used either alone or in combination with other organic or inorganic particles.

Particles used herein can include newly synthesized or virgin materials as well as recycled or reclaimed materials or portions of recycled materials. In some embodiments, reclaim streams can be from the composition herein or from other extrusion, molding, or pultrusion compositions. As such, in some embodiments particles herein can include portions of multiple materials.

In various embodiments, the particles can be substantially uniformly dispersed within a given extruded composition.

In some embodiments, the particles used herein can include a single particle type in terms of material and dimensions, and in other embodiments can include a mixture of different particle types and/or fiber dimensions. In some embodiments, the particles used herein can include a first particle type and/or size in combination with a second particle type and/or size.

In various embodiments, particles used herein can be coated with a material. By way of example, particles can be coated with a lubricant, a tie layer, or other type of compound.

The amount of the particles used in the composition can vary based on the application. In some embodiments, the amount of particles in the extruded composition with fibers can be greater than or equal to about 1, 2, 4, 6, 8, 10, 15, 20, 25, or 30 wt. % (calculated based on the weight of the particles as a percent of the total weight of the extruded composition in which the particles are disposed). In some embodiments, the amount of particles in the extruded composition with fibers can be less than or equal to about 80, 75, 70, 65, 60, 55, 50, 45, 40, 35, 30, 25, 20, 15, 10, or 5 weight percent. In some embodiments, the amount of particles can be in a range wherein each of the foregoing numbers and serve as the upper or lower bound of the range provided that the upper bound is larger than the lower bound.

The amount of particles in the extruded composition, as measured based on volume, can be greater than or equal to about 1, 2, 3, 4, 5, 6, 7, 8, 9, 10, 12, 14, 16, 18, 20, 22, 24, 26, 28, 30, 32, 34, or 36 percent of the total composition. In some embodiments, the amount of particles as measured based on volume can be in a range wherein any of the foregoing amounts can serve as the upper or lower bound of the range.

It will be appreciated that in some embodiments, some amount of out of specification particles can also be included. As such, in some embodiments, at least 50, 60, 70, 80, 90, 95, or 98 wt. % of the total particle content of the composition are those such the particles described above. For example, in some embodiments at least 50 wt. % of the particles are selected from the group consisting of organic particles having an average largest dimension of greater than 100 microns and an aspect ratio of 4:1 or less and inorganic particles having an average largest dimension of greater than 10 microns and an aspect ratio of 4:1 or less.

In some embodiments, composites herein including fibers can specifically include non-aligned fibers. As used herein, the term "non-aligned" with regard to fiber orientation shall refer to the state of fibers in an extrusion with their lengthwise axis not exhibiting the same degree of alignment (e.g., parallel to) to the direction of extrusion that an otherwise similar composition lacking particles as described herein would assume after going through an extrusion process. Non-aligned fibers can exhibit an average offset angle relative to the extrusion direction of greater than 20 degrees.

As used herein, the term "substantially random" with regard to fiber orientation shall refer to the state of the fibers in an extrusion with their lengthwise axis not being substantially aligned in parallel with the direction of extrusion of the article. The phrase "substantially random" does not require the orientation of the fibers to be completely mathematically random.

Descriptions herein of exemplary fibers are only applicable for the description of embodiments herein and not for other patents or patent applications of the applicant and/or inventors unless explicitly stated to the contrary. Various embodiments of compositions and extrudates herein include a fiber component.

The fiber component can include fibers of various types and in various amounts. Exemplary fibers can include cellulosic and/or lignocellulosic fibers. By way of example, fibers used in embodiments herein can include materials such as glasses, polymers, ceramics, metals, carbon, basalt, composites, or the like, and combinations of these. Exemplary glasses for use as fibers can include, but are not limited to, silicate fibers and, in particular, silica glasses, borosilicate glasses, alumino-silicate glasses, alumino-borosilicate glasses and the like. Exemplary glass fibers can also include those made from A-glass, AR-glass, D-glass, E-glass with boron, E-glass without boron, ECR glass, S-glass, T-glass, R-glass, and variants of all of these. Exemplary glass fibers include 415A-14C glass fibers, commercially available from Owens Corning.

Exemplary polymers for use as fibers can include, but are not limited to, both natural and synthetic polymers. Polymers for fibers can include thermosets as well as thermoplastics with relatively high melt temperatures, such as 210 degrees Celsius or higher.

Natural fibers that can be used in the invention include fibers derived from jute, flax, hemp, ramie, cotton, kapok, coconut, palm leaf, sisal, and others.

Synthetic fibers that can be used in the manufacture of the composites herein include cellulose acetate, acrylic fibers such as acrylonitrile, methylmethacrylate fibers, methylacrylate fibers, and a variety of other basic acrylic materials including homopolymers and copolymers of a variety of acrylic monomers, aramid fibers which comprise polyamides having about 85% or more of amide linkages directly attached to two aromatic rings, nylon fibers, polyvinylidene dinitryl polymers. Polyester including polyethylene terephthlate, polybutylene terephthlate, polyethylene naphthalate, RAYON, polyvinylidene chloride, spandex materials such as known segmented polyurethane thermoplastic elastomers, vinyl alcohol, and modified polyvinyl alcohol polymers and others.

Fibers used herein can include newly synthesized or virgin materials as well as recycled materials or portions of recycled materials.

In some embodiments, the material of the fibers can be organic in nature. In other embodiments, the material of the fibers can be inorganic in nature. Fibers can be carbon fibers, basalt fibers, cellulosic fibers, ligno-cellulosic fibers, silicate fibers, boron fibers, and the like. Exemplary metal fibers that can be used herein can include steel, stainless steel, aluminum, titanium, copper and others.

Fibers used herein can have various tensile strengths. Tensile strength can be measured in various ways, such as in accordance with ASTM D2101. In some embodiments, the tensile strength of fibers used herein can be greater than or equal to about 1000, 1500, 2000, 2500, or 3000 MPa. In some embodiments, the tensile strength of fibers herein can be less than about 5000 MPa.

Fibers herein can include those having various dimensions. Fibers used herein can have an average diameter greater than or equal to about 1, 2, 3, 4, 5, 10, 15, 20, 25, 30, 35, 40, 45, 50, 100, 200, 300, or 500 microns. In some embodiments, fibers used herein can have an average diameter of less than or equal to about 1000, 900, 800, 700, 600, 500, 400, 300, 200, 100, or 50 microns. In various embodiments, the average diameter of fibers used herein can be in a range wherein any of the foregoing diameters can serve as the upper or lower bound of the range, provided that the upper bound is greater than the lower bound. In some embodiments, the average diameter of the fibers used herein can be from 2 microns to 50 microns. In some embodiments, the average diameter of the fibers used herein can be from 10 microns to 20 microns.

Fibers used herein can have an average length of greater than or equal to about 0.1, 0.2, 0.4, 0.6, 0.8, 1, 2, 3, 4, 6, 8, 10, 12, 14, 16, 18, 20, 30, 40, 50, or 100 millimeters in length. In some embodiments, fibers used herein can have an average length of less than or equal to about 150, 100, 90, 80, 70, 60, 50, 40, 30 20, 10, 8, 5, 4, 3, or 2 millimeters. In various embodiments, the average length of fibers used herein can be in a range where any of the foregoing lengths can serve as the upper or lower bound of the range, provided that the upper bound is greater than the lower bound. In some embodiments, the average lengths of the fibers used herein can be from 0.2 millimeters to 10 millimeters. In some embodiments, the average lengths of the fibers used herein can be from 2 millimeters to 8 millimeters. It will be appreciated that fiber breakage typically occurs because of shear forces within the extruder. Therefore, the foregoing lengths can be as measured prior to compounding and/or extruding steps or after compounding and/or extruding steps such as in the finished extrudate.

Fibers herein can also be characterized by their aspect ratio, wherein the aspect ratio is the ratio of the length to the diameter. In some embodiments, fibers herein can include those having an aspect ratio of about 10,000:1 to about 1:1. In some embodiments, fibers herein can include those having an aspect ratio of about 5,000:1 to about 1:1. In some embodiments, fibers herein can include those having an aspect ratio of about 600:1 to about 2:1. In some embodiments, fibers herein can include those having an aspect ratio of about 500:1 to about 4:1. In some embodiments, fibers herein can include those having an aspect ratio of about 400:1 to about 15:1. In some embodiments, fibers herein can include those having an aspect ratio of about 350:1 to about 25:1. In some embodiments, fibers herein can include those having an aspect ratio of about 300:1 to about 50:1.

It will be appreciated that in many embodiments not every fiber used will be identical in its dimensions and, as such, the foregoing dimensions can refer to the average (mean) of the fibers that are used.

It will be appreciated that the dimensions of fibers can change during processing steps associated with the creation of extruded articles including, but not limited to, steps of compounding and/or extruding. As such, in some embodiments the foregoing measures of aspect ratio, length, and diameter can be as measured before such processing steps or as measured after such processing steps.

In some embodiments, the fibers used herein can include a single fiber type in terms of material and dimensions and in other embodiments can include a mixture of different fiber types and/or fiber dimensions. In some embodiments, the fibers used herein can include a first fiber type and/or size in combination with a second fiber type and/or size.

In various embodiments, fibers used herein can be coated with a material. By way of example, fibers can be coated with a lubricant, a tie layer, or other type of compound.

The amount of the fibers used in the composition can vary based on the application. In some embodiments, the amount of fibers in the extruded composition can be greater than or equal to about 2, 4, 6, 8, 10, 15, 20, 25, 30, 40, 50, 60, 70, or even 80 wt. % (calculated based on the weight of the fibers as a percent of the total weight of the extruded composition in which the fibers are disposed). In some embodiments, the amount of fibers in extruded composition can be less than or equal to about 90, 80, 75, 70, 65, 60, 55, 50, 45, 40, 35, 30, 25, 20, or 15 weight percent. In some embodiments, the amount of fibers in the extruded composition can be in a range wherein each of the foregoing numbers can serve as the upper or lower bounds of the range provided that the upper bound is larger than the lower bound.

In various embodiments, the particles can be substantially uniformly dispersed within a given extruded composition.

As used herein, the term "resin" shall refer to the thermoplastic polymer content of the extruded or pultruded composition. The resin portion of the composition excludes any polymer content provided by processing aids.

Polymer resins used with embodiments herein (including "first compositions" and/or "second compositions" herein) can include various types of polymers including, but not limited to, addition polymers, condensation polymers, natural polymers, treated polymers, and thermoplastic resins.

Thermoplastic resins herein can include addition polymers including poly alpha-olefins, polyethylene, polypropylene, poly 4-methyl-pentene-1, ethylene/vinyl copolymers, ethylene vinyl acetate copolymers, ethylene acrylic acid copolymers, ethylene methacrylate copolymers, ethylmethylacrylate copolymers, etc.; thermoplastic propylene polymers such as polypropylene, ethylene-propylene copolymers, etc.; vinyl chloride polymers and copolymers; vinylidene chloride polymers and copolymers; polyvinyl alcohols, acrylic polymers made from acrylic acid, methacrylic acid, methylacrylate, methacrylate, acrylamide and others. Fluorocarbon resins such as polytetrafluoroethylene, polyvinylidiene fluoride, and fluorinated ethylene-propylene resins. Styrene resins such as a polystyrene, alpha-methylstyrene, high impact polystyrene acrylonitrile-butadiene-styrene polymers.

A variety of condensation polymers can also be used in the manufacture of the composites herein including nylon (polyamide) resins such as nylon 6, nylon 66, nylon 10, nylon 11, nylon 12, etc. A variety of polyester materials can be made from dibasic aliphatic and aromatic carboxylic acids and di- or triols. Representative examples include polyethylene-terephthlate, polybutylene terephthlate and others.

Polycarbonates can also be used in the polymeric resin. Such polycarbonates are long chained linear polyesters of carbonic acid and dihydric phenols typically made by reacting phosgene ($COCl_2$) with bisphenol A resulting in transparent, tough, dimensionally stable plastics. A variety of other condensation polymers are used including polyetherimide, polysulfone, polyethersulfone, polybenzazoles, aromatic polysulfones, polyphenylene oxides, polyether ether ketone, and others.

Poly(vinyl chloride) can be used as a homopolymer, but can also be combined with other vinyl monomers in the manufacture of polyvinyl chloride copolymers. Such copolymers can be linear copolymers, branched copolymers, graft copolymers, random copolymers, regular repeating copolymers, block copolymers, etc. Monomers that can be combined with vinyl chloride to form vinyl chloride copolymers include a acrylonitrile; alpha-olefins such as ethylene, propylene, etc.; chlorinated monomers such as vinylidene chloride, chlorinated polyethylene, acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

In some embodiments, poly(vinyl chloride) polymers having an average molecular weight (Mn) of about 40,000 to about 140,000 (90,000+/−50,000) can be used. In some embodiments, poly(vinyl chloride) polymers having an average molecular weight (Mn) of about 78,000 to about 98,000 (88,000+/−10,000) can be used.

In some embodiments, poly(vinyl chloride) polymers used herein can have an inherent viscosity (IV-ASTM D-5225) of about 0.68 to about 1.09. In some embodiments, poly(vinyl chloride) polymers used herein can have an inherent viscosity of about 0.88 to about 0.92.

In some embodiments, poly(vinyl chloride) polymers used herein can have a glass transition temperature (Tg) of about 70 to about 80 degrees.

Poly(vinyl chloride) polymers are available from many sources under various tradenames including, but not limited to, Oxy Vinyl, Vista 5385 Resin, Shintech SE-950EG and Oxy Vinyl 225G, among others.

In some embodiments, polypropylene having a melt flow rate (g/10 min) (ASTM D1238, 230C) of 0.5 to 75.0 can be used. In some embodiments, polypropylene having a glass transition temperature (Tg) of about 0 to about 20 degrees Celsius can be used.

In some embodiments, polyethylene terephthalate (PET) having an intrinsic viscosity (IV) (Dl/g) of about 0.76 to about 0.9 can be used. In some embodiments, polyethylene terephthalate (PET) having a glass transition temperature (Tg) of about 70 to about 80 degrees Celsius can be used. In some embodiments, glycol modified polyethylene terephthalate (PETG) having a glass transition temperature (Tg) of about 78-82 degrees Celsius can be used.

In some embodiments, polybutylene terephthalate (PBT) having a melt flow rate (g/10 min) (ASTM D1238, 1.2 kg, 250 C) of 100 to 130 can be used. In some embodiments, polybutylene terephthalate (PBT) having a glass transition temperature (Tg) of about 45 to about 85 degrees Celsius can be used.

Polymer blends or polymer alloys can be used herein. Such alloys can include two miscible polymers blended to form a uniform composition. A polymer alloy at equilibrium comprises a mixture of two amorphous polymers existing as a single phase of intimately mixed segments of the two macro molecular components. Miscible amorphous polymers can form glasses upon sufficient cooling and a homogeneous or miscible polymer blend can exhibit a single, composition dependent glass transition temperature (Tg). An immiscible or non-alloyed blend of polymers typically displays two or more glass transition temperatures associated with immiscible polymer phases.

Polymeric resin materials herein can retain sufficient thermoplastic properties to permit melt blending with fiber, to permit formation of extruded articles or other extrudates such as pellets, and to permit the composition material or pellet to be extruded in a thermoplastic process or in conjunction with a pultrusion process.

In some embodiments, polymer resins herein can include extrusion grade polymer resins. In some embodiments, polymer resins herein can include resins other than extrusion grade polymer resins, including, but not limited to, injection molding grade resins. Polymer resins used herein can include non-degradable polymers. Non-degradable polymers can include those that lack hydrolytically labile bonds (such as esters, orthoesters, anhydrides and amides) within the polymeric backbone. Non-degradable polymers can also include those for which degradation is not mediated at least partially by a biological system. In some embodiments, polymers that are otherwise degradable can be made to be non-degradable through the use of stabilizing agents that prevent substantial break down of the polymeric backbone.

Polymer resins herein can include those derived from renewable resources as well as those derived from non-renewable resources. Polymers derived from petroleum are generally considered to be derived from non-renewable resources. However, polymers that can be derived from biomass are generally considered to be derived from renewable resources. Polymer resins can specifically include polyesters (or biopolyesters) derived from renewable resources, including, but not limited to polyhydroxybutyrate, polylactic acid (PLA or polylactide), and the like. Such polymers can be used as homopolymer and/or copolymers including the same as subunits. Polymer resins herein can specifically include extrusion grade polymers.

PLA can be amorphous or crystalline. In certain embodiments, the PLA is a substantially homopolymeric polylactic acid. Such a substantially homopolymeric PLA promotes crystallization. Since lactic acid is a chiral compound, PLA can exist either as PLA-L or PLA-D. As used herein, the term homopolymeric PLA refers to either PLA-L or PLA-D, wherein the monomeric units making up each polymer are all of substantially the same chirality, either L or D. Typically, polymerization of a racemic mixture of L- and D-lactides usually leads to the synthesis of poly-DL-lactide (PDLLA), which is amorphous. In some instances, PLA-L and PLA-D will, when combined, co-crystallize to form stereoisomers, provided that the PLA-L and PLA-D are each substantially homopolymeric, and that, as used herein, PLA containing such stereoisomers is also to be considered homopolymeric. Use of stereospecific catalysts can lead to heterotactic PLA, which has been found to show crystallinity. The degree of crystallinity can be influenced by the ratio of D to L enantiomers used (in particular, greater amount of L relative to D in a PLA material is desired), and to a lesser extent on the type of catalyst used. There are commercially available PLA resins that include, for example, 1-10% D and 90-99% L. Further information about PLA can be found in the book *Poly(Lactic Acid) Synthesis, Structures, Properties, Processing, and Applications*, Wiley Series on Polymer Engineering and Technology (Rafael Auras et al. eds., 2010).

In some embodiments, polylactic acid polymers having number average molecular weights of about 50,000 to 111,000, or weight average molecular weights (Mw) ranging from 100,000 to 210,000, and polydispersity indices (PDI) of 1.9-2 can be used.

In some embodiments, polylactic acid polymers having a melt flow rate (g/10 min) (ASTM D1238, 210 C 2.16 kg) of about 5.0 to about 85 can be used. In some embodiments, polylactic acid polymers having a glass transition temperature (Tg) of about 45 to about 65 degrees Celsius can be used. In some embodiments, polylactic acid polymers having a glass transition temperature (Tg) of about 55 to about 75 degrees Celsius can be used.

Polymers of the polymer resin used herein can have various glass transition temperatures, but in some embodiments glass transition temperatures of at least 120, 130, 140, 150, 160, 170, 180, 190, 200, 220, 240, 260, 280, 300, 320, 340, 360, 380 or 400 degrees Fahrenheit. In some embodiments, polymers having a glass transition temperature of from about 140° F. to about 220° F. can be used.

The polymer resin can make up the largest share of the extruded composition. In some embodiments, the polymer resin is at least about 20, 25, 30, 35, 40, 45, 50, 55, 60, 65, 70, 75, 80, 85, 90, 95, 98, or 99 wt. % of the extruded composition. In some embodiments, the amount of the polymer resin in the composition can be in a range wherein any of the foregoing numbers can serve as the upper or lower bound of the range, provided that the upper bound is larger than the lower bound.

Composite compositions herein (including but not limited to compositions referred to as "second compositions herein") can also include impact modifiers. Impact modifiers can include acrylic impact modifiers. Acrylic impact modifiers can include traditional type acrylic modifiers as well as core-shell type impact modifiers. Exemplary acrylic impact modifiers can include those sold under the tradename DURASTRENGTH, commercially available from Arkema, and PARALOID (including, specifically, KM-X100) commercially available from Dow Chemical.

Impact modifiers can also include various copolymers including, but not limited to, ethylene-vinyl acetate (EVA), acrylonitrile-butadiene-styrene (ABS), methacrylate butadiene styrene (MBS), chlorinated polyethylene (CPE), ethylene-vinyl acetate-carbon monoxide, or ethylene-n-butyl acrylate-carbon monoxide. Exemplary impact modifier copolymers can include those sold under the tradename ELVALOY, commercially available from DuPont.

The amount of impact modifier used can vary in different embodiments. One approach to quantifying the amount of impact modifier used can be with reference to the amount of polymer resin used. As is common in the extrusion art, this type of quantification can be stated as the parts by weight of the component in question per hundred parts by weight of the polymer resin. This can be referred to as "parts per hundred resin" or "phr".

In some embodiments, the composition can include an amount of impact modifier of greater than or equal to 0.1 phr, 0.5 phr, 1 phr, 2 phr, 3 phr, 4 phr, 5 phr, 6 phr, 7 phr, 8 phr, 10 phr, 12.5 phr, 15 phr, or 20 phr. In some embodiments, the composition can include an amount of impact modifier of less than or equal to 40 phr, 35 phr, 30 phr, 27.5 phr, 25 phr, 22.5 phr, 20 phr, 17.5 phr, or 15 phr. In some embodiments, the composition can include an amount of impact modifier in a range wherein any of the foregoing numbers can serve as the lower or upper bounds of the range provided that the lower bound is less than the upper bound.

By way of example, in some embodiments, the composition can include an amount of impact modifier of greater than or equal to 0.1 phr and less than or equal to 40 phr. In some embodiments, the composition can include an amount of impact modifier of greater than or equal to 1.0 phr and less than or equal to 30 phr. In some embodiments, the composition can include an amount of impact modifier of greater than or equal to 1.0 phr and less than or equal to 30 phr. In some embodiments, the composition can include an amount of impact modifier of greater than or equal to 2.0 phr and less than or equal to 25 phr. In some embodiments, the composition can include an amount of impact modifier of greater than or equal to 3.0 phr and less than or equal to 25 phr. In some embodiments, the composition can include an amount of impact modifier of greater than or equal to 4.0 phr and less than or equal to 25 phr.

In some embodiments, the composition can include an amount of impact modifier of greater than or equal to 5 phr and less than or equal to 25 phr. In some embodiments, the composition can include an amount of impact modifier of greater than or equal to 6 phr and less than or equal to 20 phr. In some embodiments, the composition can include an amount of impact modifier of greater than or equal to 7 phr and less than or equal to 20 phr. In some embodiments, the composition can include an amount of impact modifier of greater than or equal to 5 phr and less than or equal to 20 phr. In some embodiments, the composition can include an amount of impact modifier of greater than or equal to 10 phr and less than or equal to 20 phr.

It will be appreciated that various other components can be extruded with compositions herein (first or second compositions) and in some cases can form part of compositions herein. By way of example, process aids can be included in various embodiments.

Examples of process aids include acrylic processing aids, waxes, such as paraffin wax, stearates, such as calcium stearate and glycerol monostearate, and polymeric materials, such as oxidized polyethylene. Various types of stabilizers can also be included herein such as UV stabilizers, lead, tin and mixed metal stabilizers, and the like. It is contemplated that there may be examples wherein satisfactory results may be obtained without one or more of the disclosed additives. Exemplary processing aids can include a process aid that acts as a metal release agent and possible stabilizer available under the trade designation XL-623 (paraffin, montan and fatty acid ester wax mixture) from Amerilubes, LLC of Charlotte, N.C. Calcium stearate is another suitable processing aid that can be used as a lubricant. Typical amounts for such processing aids can range from 0 to 20 wt. % based on the total weight of the composition, depending on the melt characteristics of the formulation that is desired. In some embodiments, the amount of processing aids is from 2 to 14 wt. %. In some embodiments, the amount of processing aids (as measured in parts per hundred resin) can range from 0 to 40 phr, 0.5 to 30 phr, or 0.5 to 20 phr.

Examples of other components that can be included are calcium carbonate, titanium dioxide, pigments, and the like.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. An impact-resistant fenestration unit comprising:

a frame assembly comprising a sill, a head jamb, and two opposed side jambs;

a bottom sash, the bottom sash comprising a bottom rail, a check rail, and two opposed stiles, the bottom sash configured to move within the frame between a closed position where a bottom portion of the bottom sash engages a top of the sill and an open position where the bottom portion of the bottom sash is separated from the top of the sill; the bottom sash forming a first lower corner, a second lower corner, a first upper corner, and a second upper corner;

a first corner key configured to engage the bottom sash at the first lower corner, the first corner key comprising a support arm extending in a first direction onto or into a first stile of the two opposed stiles; and a first reinforcement member disposed on or within the first stile, the first reinforcement member comprising a first end, a second end, and an overlap tab projecting from the first end of the first reinforcement member, wherein the first end overlaps a portion of the support arm of the first corner key.

2. The impact-resistant fenestration unit of claim 1, wherein the first end of the first reinforcement member overlaps a portion of the support arm of the first corner key on a side of the first corner key facing an exterior side of the impact-resistant fenestration unit.

3. The impact-resistant fenestration unit of claim 1, further comprising a second corner key configured to engage the bottom sash at the second lower corner, the second corner key comprising a support arm extending in the first direction onto or into a second stile of the two opposed stiles; and a second reinforcement member disposed on or within the second stile, the second reinforcement member comprising a first end and a second end, wherein the first end overlaps a portion of the support arm of the second corner key.

4. The impact-resistant fenestration unit of claim 3, wherein the first end of the second reinforcement member overlaps a portion of the support arm of the second corner key on a side of the second corner key facing an exterior side of the impact-resistant fenestration unit.

5. The impact-resistant fenestration unit of claim 3, further comprising a third corner key configured to engage the bottom sash at the first upper corner, the third corner key comprising a support arm extending in a second direction that is opposite the first direction onto or into the first stile of the two opposed stiles; and a fourth corner key configured to engage the bottom sash at the second upper corner, the fourth corner key comprising a support arm extending in the second direction onto or into the second stile of the two opposed stiles;

wherein the second end of the first reinforcement member overlaps a portion of the support arm of the third corner key; and wherein the second end of the second reinforcement member overlaps a portion of the support arm of the fourth corner key.

6. The impact-resistant fenestration unit of claim 5, further comprising a third reinforcement member and a fourth reinforcement member;

wherein the third reinforcement member is disposed on or within the bottom rail; and wherein the fourth reinforcement member is disposed on or within the check rail.

7. The impact-resistant fenestration unit of claim 1, wherein the first end of the first reinforcement member overlaps a portion of the support arm of the first corner key by a distance of at least 0.1 inches.

8. The impact-resistant fenestration unit of claim 1, wherein the overlap tab is uniplanar.

9. The impact-resistant fenestration unit of claim 1, the overlap tab having a thickness less than an adjacent portion of the first reinforcement member.

10. The impact-resistant fenestration unit of claim 1, wherein the overlap tab is physically unattached to the support arm of the first corner key.

11. The impact-resistant fenestration unit of claim 1, wherein the first end of the first reinforcement member is attached to the support arm of the first corner key.

12. The impact-resistant fenestration unit of claim 1, the bottom rail, check rail, and two opposed stiles formed from a lineal extrusion comprising a thermoplastic resin.

13. The impact-resistant fenestration unit of claim 1, wherein at least one of the bottom rail, check rail, and two opposed stiles includes a portion comprising a composite including a thermoplastic resin and at least one of particles and glass fibers.

14. The impact-resistant fenestration unit of claim 1, further comprising a top sash, the top sash comprising a top rail, a check rail, and two opposed stiles; the top sash forming a first lower corner, a second lower corner, a first upper corner, and a second upper corner;

a first top sash corner key configured to engage the top sash at the first lower corner, the first top sash corner key comprising a support arm extending in a first direction onto or into a first stile of the two opposed stiles;

a second top sash corner key configured to engage the top sash at the second lower corner, the second top sash corner key comprising a support arm extending in the first direction onto or into a second stile of the two opposed stiles; and a first top sash reinforcement member disposed on or within the first stile, the first top sash reinforcement member comprising a first end and a second end, wherein the first end overlaps a portion of the support arm of the first top sash corner key; and a second top sash reinforcement member disposed on or within the second stile, the second top sash reinforcement member comprising a first end and a second end, wherein the first end overlaps a portion of the support arm of the second top sash corner key.

15. The impact-resistant fenestration unit of claim 1, wherein a joint between the first reinforcement member and the first corner key is configured to exhibit asymmetric directional load transmission properties.

16. The impact-resistant fenestration unit of claim 1, wherein the first stile of the two opposed stiles and the bottom rail intersect appearing as a mortise and tenon joint, the first stile of the two opposed stiles and the check rail intersect appearing as a mortise and tenon joint, the second stile of the two opposed stiles and the bottom rail intersect appearing as a mortise and tenon joint, and the second stile of the two opposed stiles and the check rail intersect appearing as a mortise and tenon joint.

17. The impact-resistant fenestration unit of claim 1, wherein at least one of the first stile, the second stile, the bottom rail, and the check rail comprises a thermal break between interior and exterior sides thereof.

18. An impact-resistant fenestration unit comprising:

a frame assembly comprising a sill, a head jamb, and two opposed side jambs;

a bottom sash, the bottom sash comprising a bottom rail, a check rail, and two opposed stiles, the bottom sash configured to move within the frame between a closed position where a bottom portion of the bottom sash engages a top of the sill and an open position where the bottom portion of the bottom sash is separated from the top of the sill; the bottom sash forming a first lower corner, a second lower corner, a first upper corner, and a second upper corner;

a first corner key configured to engage the bottom sash at the first lower corner, the first corner key comprising a support arm extending in a first direction onto or into a first stile of the two opposed stiles; and a first reinforcement member disposed on or within the first stile, the first reinforcement member comprising a first end, a second end, and an overlap tab projecting from the first end of the first reinforcement member, wherein the first end overlaps a portion of the support arm of the first corner key;

the check rail of the bottom sash comprising a surface defining an exterior window side top corner and an interior window side top corner, wherein a radius of curvature of the interior corner is greater than 0.2 inches;

wherein the impact-resistant fenestration unit exhibits impact resistance properties satisfying ASTM E1996-17 missile level D; and wherein the impact-resistant fenestration unit exhibits a U factor of less than or equal to 0.40 BTU/h*ft2*° F.

19. An impact-resistant fenestration unit comprising:

a frame assembly comprising a sill, a head jamb, and two opposed side jambs;

a bottom sash, the bottom sash comprising a bottom rail, a check rail, and two opposed stiles, the bottom sash configured to move within the frame between a closed position where a bottom portion of the bottom sash engages a top of the sill and an open position where the bottom portion of the bottom sash is separated from the top of the sill; the bottom sash forming a first lower corner, a second lower corner, a first upper corner, and a second upper corner;

a first corner key configured to engage the bottom sash at the first lower corner, the first corner key comprising a support arm extending in a first direction onto or into a first stile of the two opposed stiles; and a first reinforcement member disposed on or within the first stile, the first reinforcement member comprising a first end, a second end, and an overlap tab projecting from the first end of the first reinforcement member, wherein the first end overlaps a portion of the support arm of the first corner key;

the bottom sash comprising a transparent central area and the top sash comprising a transparent central area, wherein the transparent areas cover a surface area of at least 55% of the overall area defined by an outer perimeter of the frame assembly;

wherein the impact-resistant fenestration unit exhibits impact resistance properties satisfying ASTM E1996-17 missile level D; and wherein the impact-resistant fenestration unit exhibits a U factor of less than or equal to 0.40 BTU/h*ft2*° F.

* * * * *